United States Patent [19]

Sassak

[11] 4,100,780
[45] Jul. 18, 1978

[54] PROGRAM CONTROLLED TUBE BENDING MACHINE AND A BINARY FEED MECHANISM FOR USE THEREIN

[76] Inventor: Frank Sassak, c/o Bend-Rite Inc., 2215 Howard Ave., Detroit, Mich. 48216

[21] Appl. No.: 646,152

[22] Filed: Jan. 2, 1976

[51] Int. Cl.² .................. B21B 37/14; F15B 21/02
[52] U.S. Cl. ............................... 72/7; 91/167 R; 279/2 R
[58] Field of Search ............... 91/167 R, 167 A; 72/7, 72/26; 279/2 R, 2 A

[56] References Cited

U.S. PATENT DOCUMENTS

| | | | |
|---|---|---|---|
| 2,931,340 | 4/1960 | White ........................... | 91/167 |
| 3,145,756 | 8/1964 | Hill ............................... | 72/7 |
| 3,181,323 | 5/1965 | Bos ............................... | 72/26 |
| 3,187,637 | 6/1965 | Edmund ........................ | 91/167 |
| 3,426,562 | 2/1969 | Inda .............................. | 72/7 |
| 3,435,963 | 4/1969 | Jacoby et al. ................. | 279/2 A X |
| 3,548,714 | 12/1970 | Barrett .......................... | 91/167 X |

*Primary Examiner*—Othell M. Simpson
*Assistant Examiner*—Z. R. Bilinsky
*Attorney, Agent, or Firm*—Cullen, Settle, Sloman & Cantor

[57] ABSTRACT

A binary controlled tube bending machine wherein a binary punched card system is used to programmably control (1) the longitudinal position of a plurality of spaced bends along the length of a tubular workpiece; (2) the radial orientation of the bends with respect to one another; and (3) the depth of each of the bends. An elongated work support having a bending station positioned at one end thereof slidably mounts a carriage for reciprocal motion toward and away from the bending station. An arbor assembly is mounted on the carriage for releasably retaining the tubular workpiece. The reciprocal motion of a first rack gear controls the advance of the carriage to properly position the workpiece longitudinally for successive bends; the reciprocal motion of a second rack gear controls the radial orientation of the workpiece by controlling the angle through which the arbor assembly is rotated; and the vertical positioning of a limit switch which operates to terminate the stroke of a hydraulic ram having a bending die at one end thereof controls the depth of the bend. The operation of the first and second rack gears and the limit switch positioner is effected by a binary feed mechanism under the program control of a punched card system.

Each binary feed mechanism includes a plurality of cylinder assemblies arranged in an axially aligned series. Each of the assemblies has a piston, a piston rod and a cylinder housing. The length of the piston stroke of each of the assemblies represents a discrete binary number. The series is arranged sequentially so as to represent the sequence of binary numbers ($2^0, 2^1, 2^2, \ldots 2^n$).

14 Claims, 19 Drawing Figures

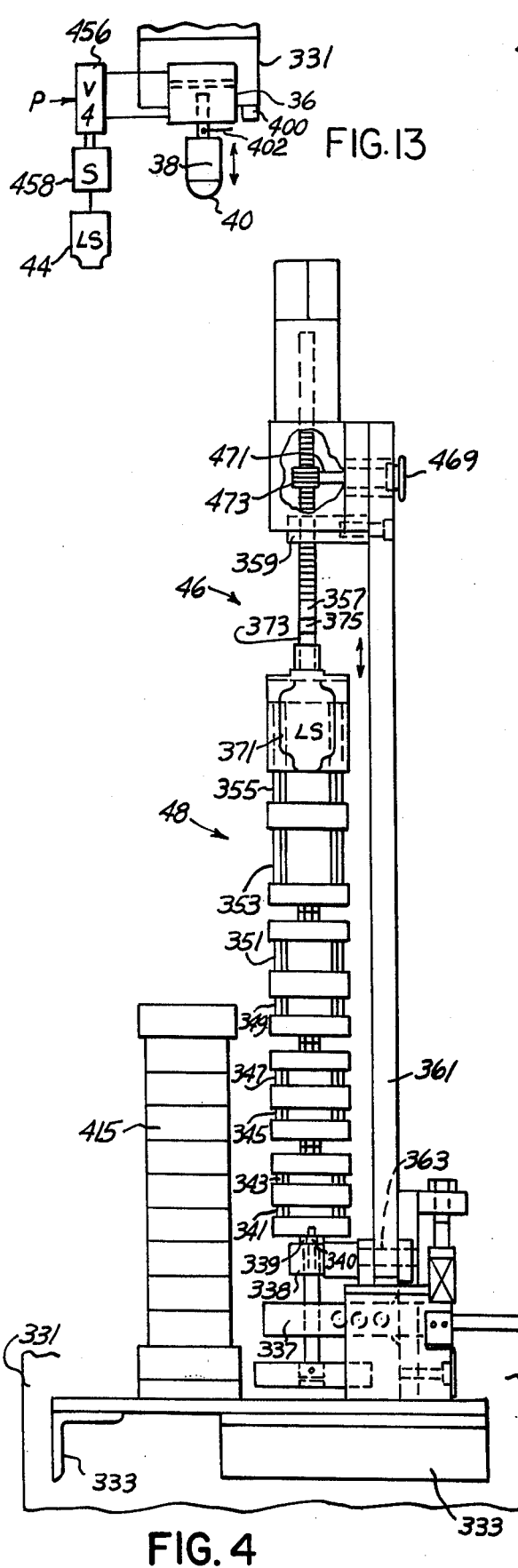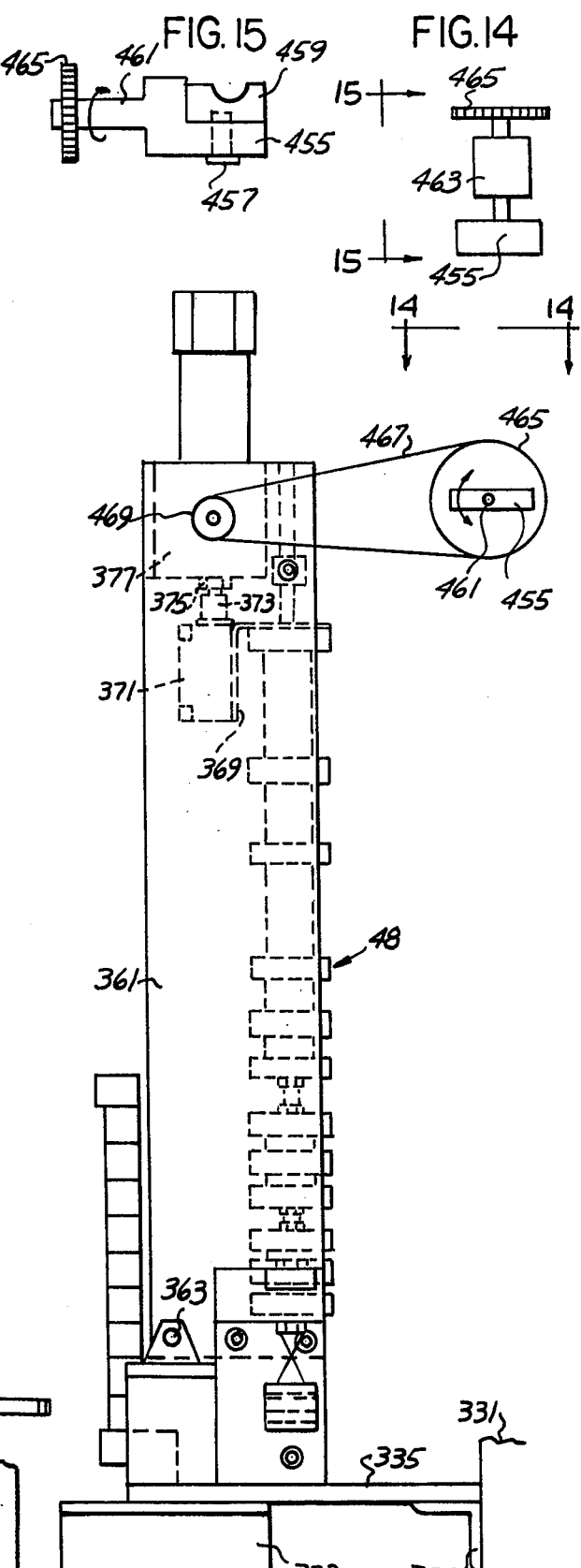

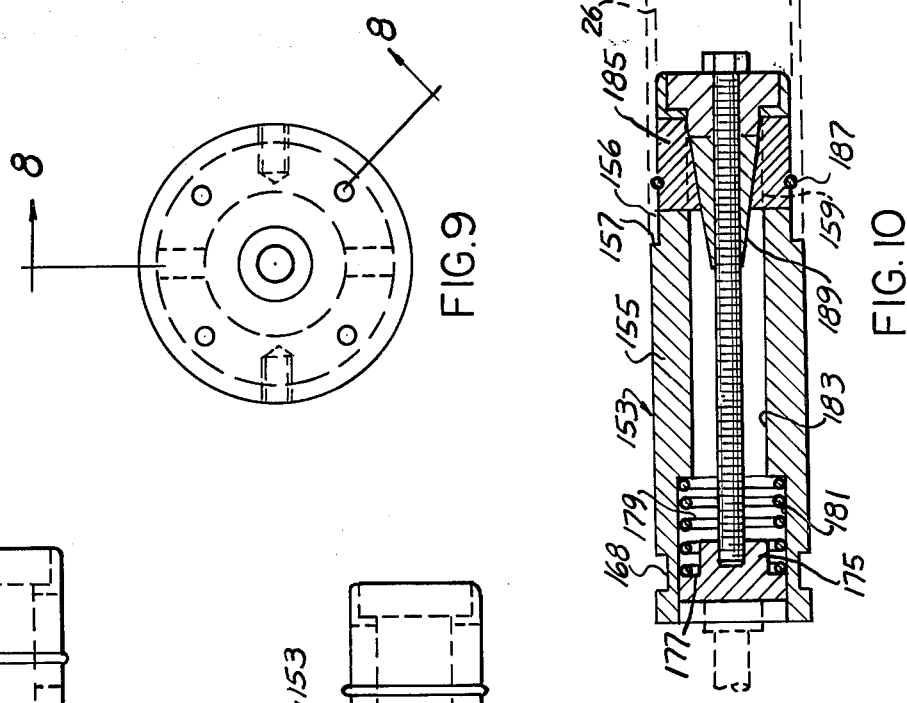
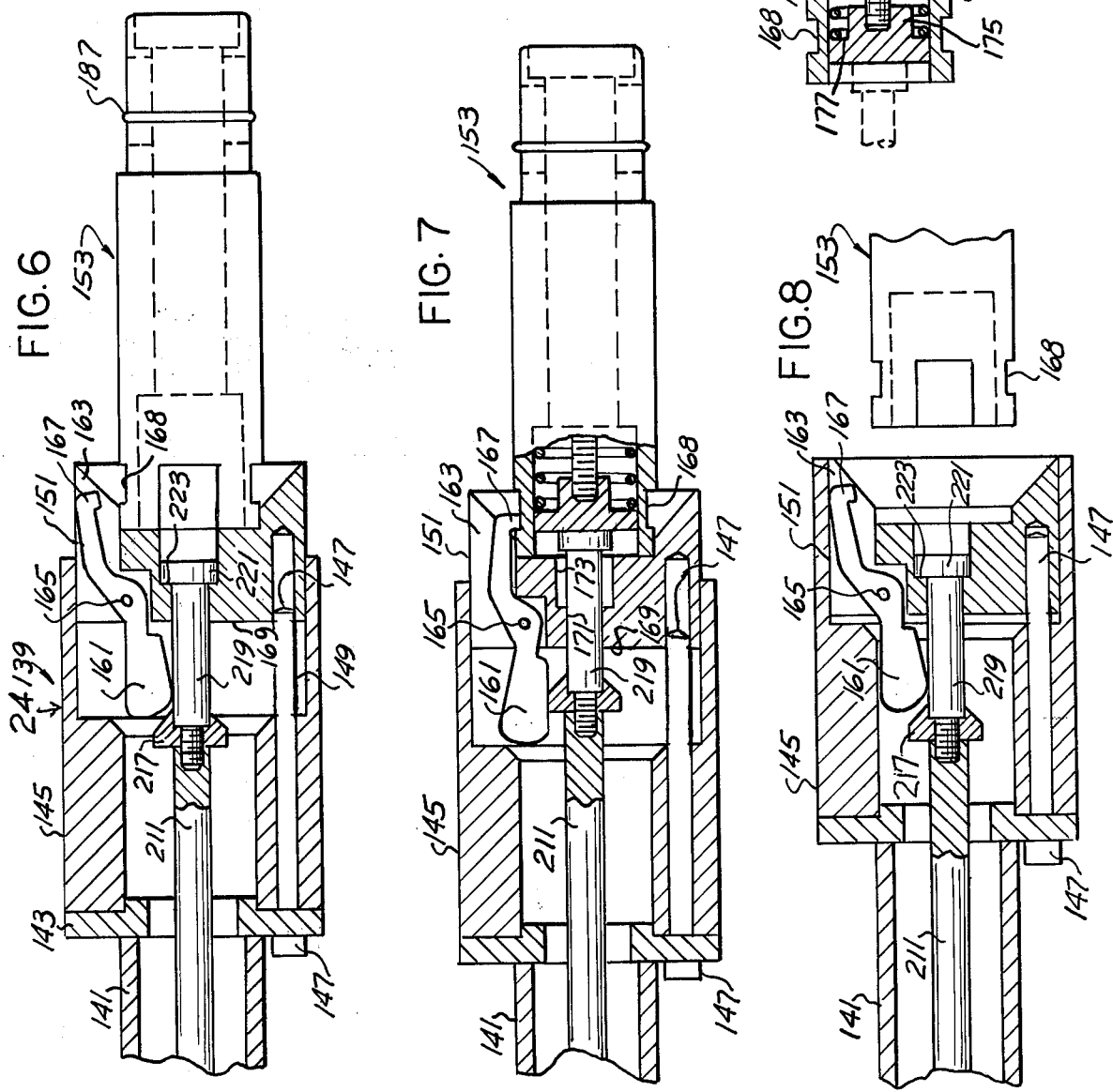

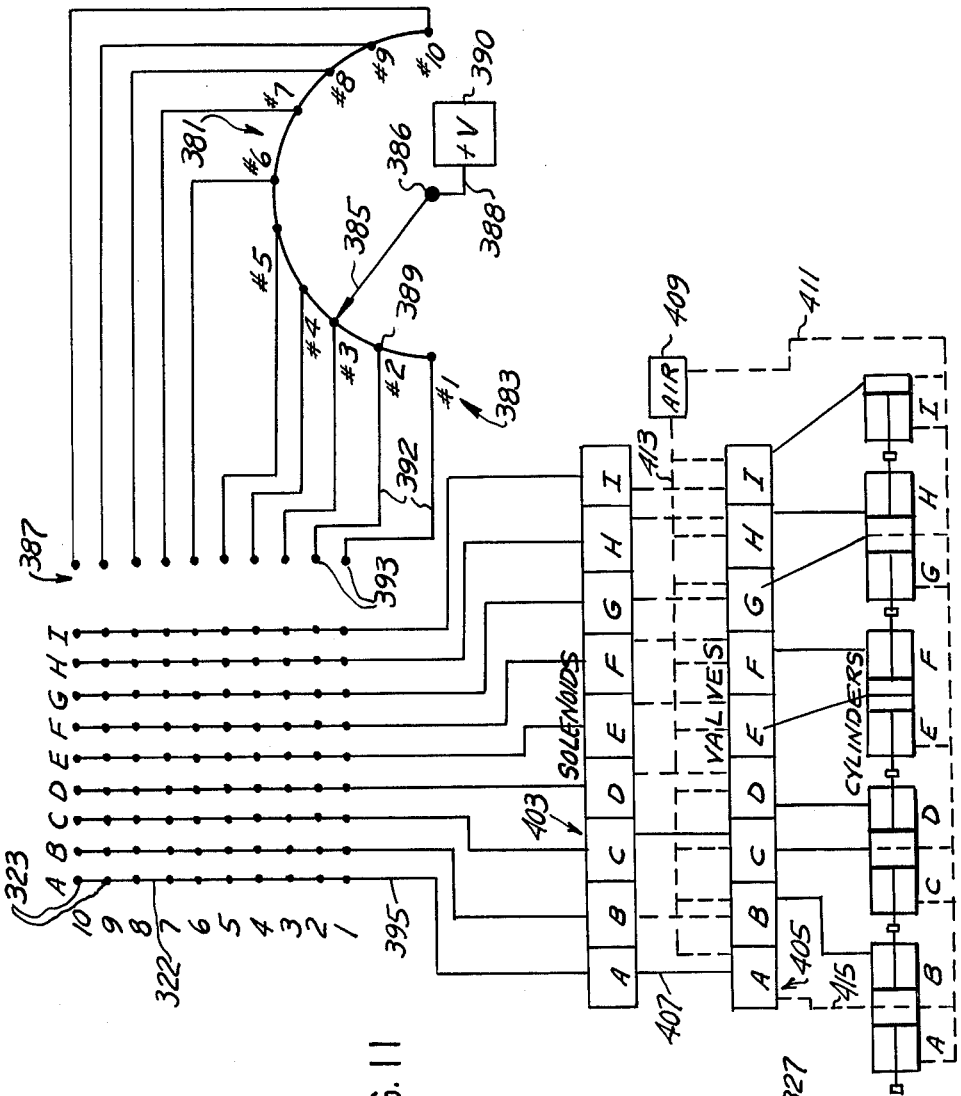
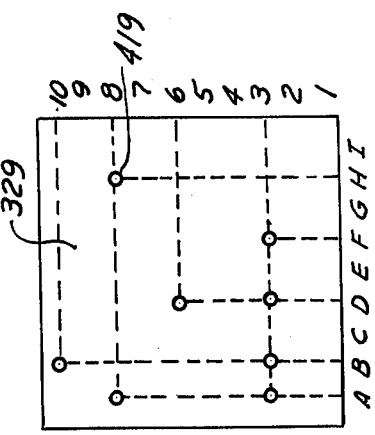
FIG. 12
FIG. 11

PROGRAM CONTROLLED TUBE BENDING MACHINE AND A BINARY FEED MECHANISM FOR USE THEREIN

BACKGROUND OF THE INVENTION

1. Field of the Invention

The invention relates generally to a binary feed mechanism and more particularly to a binary feed mechanism which may be utilized in a programably controlled tube bending machine to control the longitudinal positioning of a plurality of bends along the length of a tube, the radial orientation of the bends, and the depth thereof.

While the binary feed mechanism of the present invention was developed specifically for a tube bending machine for forming automobile exhaust pipes from straight stock, it can be used to control any type of feed movement and should not, therefore, be limited to the tube bendng applications described herein.

2. Description of the Prior Art

One particular application of the present invention is in automated tube bending machines for forming tailpipes for automotive use. Automobile tailpipes or exhaust pipes come in all sizes and shapes. This is due to the fact that first the automobiles are designed and then the exhaust pipes must be designed to fit the existing automobiles. The exhaust pipes or tailpipes are generally made by bending a length of tubing of an appropriate diameter at several selected spaced locations along its length. Each of the bends in the tubing has a predetermined radial orientation with respect to each of the other bends along the longitudinal axis of the tube and each has a predetermined angle or depth of bend.

The tubes used to make articles such as tailpipes for automobiles and furniture frames and the like which consist primarily of bent metal tubing originally employed making a first bend in one machine and then manually removing the tube to another machine where a second bend was made, and continuing in this manner until the article was completely shaped. In such applications, labor was quite expensive and greatly added to the product cost.

Subsequent innovations enabled a single machine to be used for forming a series of bends in a metal tubing or rod which is controlled so as to perform a sequence of bends of various configurations and orientations along the length of the part. The information necessary for the performance of such bends is often introduced in a coded matter prior to the initiation of first operation. The information normally relates to (1) the position of the bend along the length of the pipe; (2) the polar position of the bend with respect to the previously formed bends; and (3) the depth of the bend.

These early automated machines often required a skilled craftsman to operate the machine since several of the parameters still had to be set manually by adjusting various limit stops or the like. Some systems required the longitudinal positioning to be done manually while others required the radial orientation of the tube to be set manually by rotating an indexing disc attached to the workpiece. Eventually, however, nearly fully automated machines were designed which controlled the above parameters without human intervention.

Generally, these fully automated systems are quite expensive, relatively complex and difficult to maintain. Nearly all of these systems require some type of sensing device or transducer which continually monitors the actual longitudinal position of the tube, its angular orientation, and the depth of the bend and feeds back this information to a control system. The control system compares the feedback information with programed information representative of the desired longitudinal positioning, angular orientation, or depth, and terminates the operation when the values are alike. These systems require complex electrical feedback circuitry, motion transducers, and comparators, all of which add to the cost and complexity of the system. Still other systems use digital feedback techniques and employ counters and digital comparators determining when proper positioning has occurred. Still others employ analog techniques to compare the feedback signal with a signal indicative of the desired feed to generate an error voltage which operates a servo motor to make the necessary corrections These systems are prone to failure, difficult to mainain, costly, and do not appear to have gained broad commerical acceptance in the art.

The present invention solves all of these problems by providing a relatively simple, low-cost binary feed mechanism which provides a programably-controlled positive increment of feed without the use of feedback techniques.

The prior art United States Patents listed below are cited as being typical of the programably-controlled tube bending machines of the prior art.

U.S. Pat. No. 3,075,568—F. E. Bright
U.S. Pat. No. 3,426,562—F. Inda
U.S. Pat. No. 3,156,287—H. Munro
U.S. Pat. No. 3,557,586—D. A. Zmuda
U.S. Pat. No. 3,181,323—K. Bos
U.S. Pat. No. 3,650,140—D. A. Zmuda
U.S. Pat. No. 3,299,681—C. F. Hautau
U.S. Pat. No. 3,772,905—C. V. Peddinghaus
U.S. Pat. No. 3,808,856—B. J. Lance
U.S. Pat. No. 3,387,473—H. Noordhoek et al

SUMMARY OF THE INVENTION

These and other objects and advantages of the present invention are accomplished in an improved apparatus for bending tubing, tubular stock and the like, which is capable of automatically forming a plurality of bends at longitudinally spaced locations along the length thereof, the bends having predetermined different radial orientations which respect to one another, and predetermined different depths of bend.

The improved tube bending machine of the present invention is provided with an elongated work support having a bending station at one end thereof. A carriage is slidably mounted on the work support for reciprocal movement toward and away from the bending station. An arbor assembly is mounted on the carriage for movement therewith. The arbor assembly includes a rotational arbor for releasably retaining the tubular workpiece for radially orienting and longitudinally advancing the same. A first drive means is provided for longitudinally advancing the carriage toward the bending station and a second drive means is provided for rotating the arbor through 360°.

The bending station includes a ram mounted for reciprocal motion along an axis normal to a longitudinal axis of the tubular workpiece and the distal end of the ram mounts a bending die. The ram is hydraulically biased to the retracted or normal position but may be extended toward the workpiece with the displacement of the ram from the normal position being indicative of the depth of the bend. A positionable limit switch may be triggered to terminate the extension of the ram and cause it to immediately return to its normal position. The limit switch can be triggered by a means associated with the bending station which moves a switch actuating member toward the limit switch in proportion to the displacement of the ram from its normal position, hence, in proportion to the depth of the bend. When the predetermined depth of bend is obtained, the predetermined depth being set by the positioning of the limit switch and the actual depth being sensed by the position of the limit switch actuating member, the limit switch will be actuated to terminate the bending operation.

The longitudinal positioning of the carriage, the radial orientation of the arbor, and the positioning of the limit switch are all positively controlled by binary feed mechanisms without the use of a feedback system. Each of the binary feed mechanisms of the present invention utilizes a plurality of cylinder assemblies arranged in an axially aligned series. Each of the cylinder assemblies has a piston, a piston rod, and a cylinder housing. The length of the piston stroke of each of the assemblies defines the relative motion between the piston rod and the cylinder housing, and each assembly has a discrete length of piston stroke representing a binary number. The cylinder assemblies are arranged sequentially to form a progression of the binary numbers $(2^0, 2^1, 2^2, \ldots 2^n)$. The interior end assembly in said series of cylinder assemblies has either its cylinder housing or its piston rod rigidly anchored to a support so as to define a positional reference. The outward or distal end assembly difines the total feed movement of the mechanism. In the case of the longitudinal positioning of the carriage and in the case of the rotational positioning of the arbor, the end assembly mounts a longitudinally movable feed member. The longitudinally positionable feed member may be used to operate the carriage drive means or the arbor rotation means respectively. In the case of the depth of bend control, the end assembly mounts the positionable limit switch for controllably positioning the same. Each of the cylinder assemblies in said series are connected end-to-end such that the acutation of any given one of said assemblies causes a relative displacement between its piston rod and its cylinder housing. This displacement is equal to the discrete binary number it represents. The relative displacement produced by the actuated cylinder assembly effects a corresponding displacement of all cylinder assemblies located outwardly thereof such that the end assembly undergoes a total feed movement equal to the cumulative sum of all of the individual piston stroke lengths of displacement experienced by the individual cylinder assemblies actuated.

A punched card control system is provided whereby information representing the longitudinal distance which the workpiece must be advanced between successive bends, the angle through which it must be rotated for proper polar orientation, and the desired depth of the bend may be stored. Circuit means are provided for reading the stored information and generating coded sets of signals indicative thereof which are used to control the operation of hydraulic valves connecting the individual assemblies with a source of fluid pressure such that selected ones of the cylinder assemblies may be actuated in response to the stored program so as to cause the tubular workpiece to be longitudinally positioned to the next successive location at which a bend is to be made; to be radially oriented to the proper depth of the bend is obtained.

BRIEF DESCRIPTION OF THE DRAWINGS

These and other objects and advantages of the present invention will become more readily apparant upon reading the following detailed description of the preferred embodiment along with the claims and the appended drawings which are described briefly below:

FIG. 4 is a fragmentary front elevational view of the binary feed mechanism of the present invention used to position a limit switch to control the depth of bend formed at a bending station used in conjunction with the elongated work support of FIGS. 1A and 1B;

FIG. 5 is a fragmentary right elevational view of the binary feed mechanism of FIG. 4;

FIG. 6 is a fragmentary side elevational view of the arbor assembly of FIGS. 1A and 1B, on a larger scale, with the tubular workpiece-supporting arbor positioned within the target cup, but in the released position;

FIG. 7 is a similar fragmentary side elevational view of the arbor assembly with the arbor secured within the target cup;

FIG. 8 is a similar fragmentary side elevational view of the arbor assembly with the arbor disengaged and removed from the target cup;

FIG. 9 is an end elevational view of the arbor assembly of FIG. 8;

FIg. 10 is a longitudinal section view of the arbor body of FIGS. 1B, 6 and 7;

FIG. 11 is a schematic diagram representing the punched card control system used to programably control the binary feed mechanism of the present invention;

FIG. 12 is a plan view of a sample punch card;

FIG. 13 is a fragmentary schematic elevational view of a hydraulically operated bending ram for use in the bending station of the present invention;

FIG. 14 is a fragmentary plan view taken in the direction of view arrows 14—14 of FIG. 5;

FIG. 15 is a side elevational view taken in the direction of views arrows 15—15 of FIG. 14;

DETAILED DESCRIPTION OF THE PREFERRED EMBODIMENT

Figure 1A:
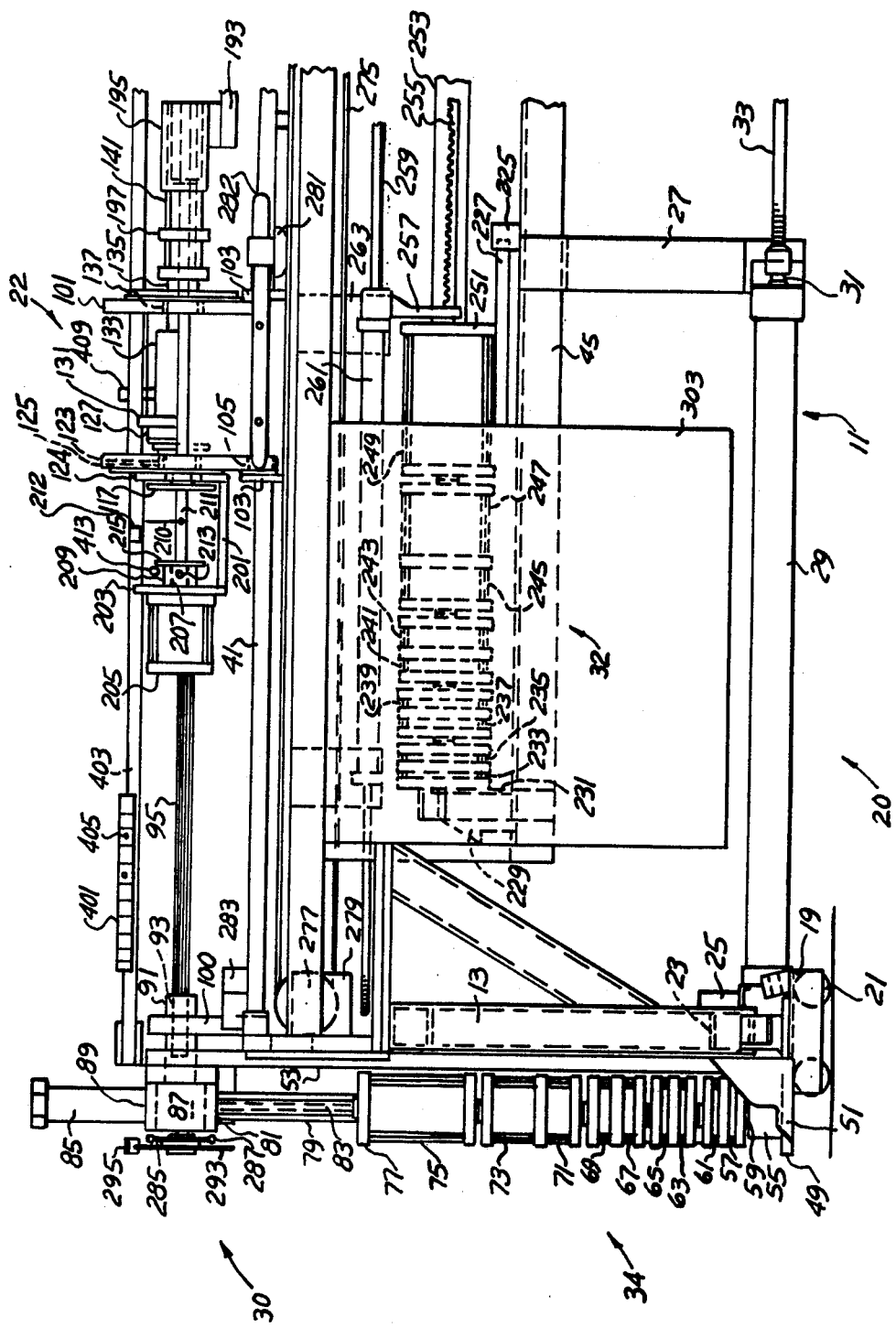
FIG. 1A is a side elevational view of the left portion of the elongated work support or table frame of the programable tube-bending machine of the present invention.
Figure 1B:
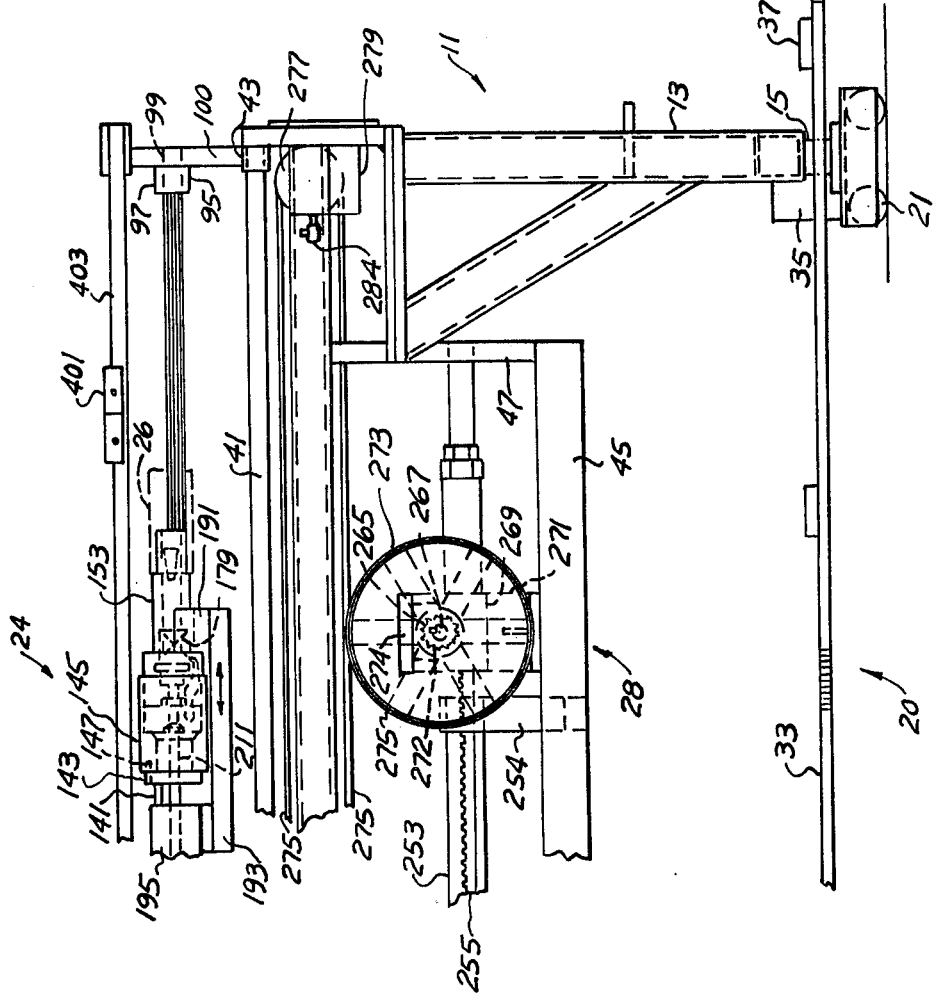
FIG. 1B is a similar side elevational view of the right hand portion of the elongated work support.

FIGS. 1A and 1B show an elongated work support or frame 20 having a bending station (generally designated 331 in FIGS. 4, 13 and 16) at one end thereof. The elongated work support or frame 20 of FIGS. 1A, 1B, 2 and 3 is provided with a carriage 22 which is slidably mounted upon the frame 20 for reciprocal movement toward and away from the bending station 331. An arbor assembly 24 is mounted on the carriage 22 for movement therewith. The arbor assembly 24 is adapted to releasably clamp the tube or tubular workpiece 26 so that it can be advanced toward the bending station 331 by the advancement of the carriage 22. The movement of the carriage 22 to longitudinally position the tubular workpiece 26 is accomplished by means of a carriage advancement assembly 28. The arbor assembly 24 may be rotated to radially orient the tubular workpiece 26 with respect to the previously formed bend by means of an arbor rotation assembly 30.

The operation of the carriage advancement assembly 28 to control the longitudinal positioning of the tubular workpiece 26 with respect to the bending station 331 is effected by a first binary feed mechanism 32 whose operation is programably controlled by a punched card control system similar to that of FIG. 11. The construction and operation of the binary feed mechanism 32 and the punched card control system of FIG. 11 will be described in detail hereafter. A second binary feed mechanism 34 which is similarly under the programmed control of a second punch card control system, similar to that of FIG. 11, is used to control the angle through which the arbor rotation assembly 30 turns the tubular workpiece 26 which is clampably retained with the arbor assembly 24 so as to insure the proper radial or polar orientation of the tubular work piece 26 at the bending station 331.

Figure 16:
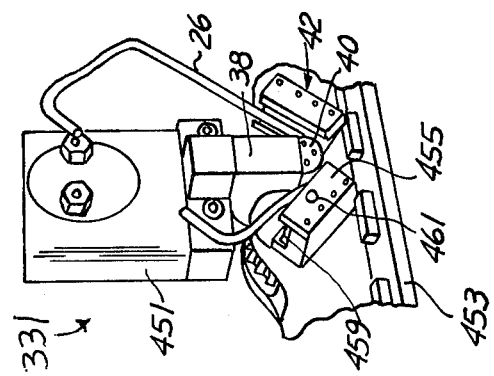
FIG. 16 is a fragmentary perspective view of a typical prior art bending station.

Once the workpiece 26 is retainably clamped within the arbor assembly 24; properly oriented to the desired polar position by the operation of the arbor rotation assembly 30 under the control of the second binary feed mechanism 34; and advanced longitudinally toward the bending station 331 by the operation of the carriage advancement assembly 28 under the control of the first binary feed mechanism 32 so as to present the next successively spaced location along the length of the tubular workpiece 26 in which a bend is to be made in operational position before the bending station 331, then the bending station 331 of FIGS. 4, 13 and 16 will actuate a hydraulic cylinder 36 to extend a ram 38 from a normally retracted position into engagement with the properly positioned and oriented tubular workpiece 26. The end of the ram 38 which contacts the tubular workpiece 26 is provided with a bending die 40 which cooperates with auxiliary wing dies 42 such that the depth of the bend in the tubular workpiece 26 is controlled by the displacement of the ram 38 from its normally retracted position. A positionable limit switch 44 may be triggered to deactuate the hydraulic cylinder 36 causing the ram 38 to terminate its movements with respect to the tubular workpiece 26 and immediately return to the normally retracted position. A switch engagement member 46 moves an extent proportional to the displacement of the ram 38 from its normally-retracted position such that the switch engagement member 46 can be caused to contact the positionable limit switch 44 when the predetermined desired depth of bend has been attained. The positioning of the limit switch 44 to control the depth of the bend is effected by a third binary feed mechanism 48 under the programmed control of another punched card system similar to that shown in FIG. 11.

The elongated work support or frame 20 shown particularly in FIGS. 1A, 1B, 2 and 3, includes a table frame 11 which is provided with spaced reinforced legs 13 at opposite ends therof. Each of the spaced legs 13 includes an adjustable leg extension member 15 and associated adjusting blocks 17. Each leg extension 15 terminates in a roller bracket 19 for supporting the respective pairs of rollers 21 for registry with the floor surface. Cross braces 23 interconnect the respective pairs of legs 13 to define with said legs 13 a framework normally spaced from but connected to a bending station schmatically shown fragmentarily at 331, FIGS. 4, 5 and 13. A cylinder mounting plate 25 depends from the cross brace 23, FIG. 1A, and is adapted to support one end of an elongated hydraulic-positioning cylinder 29, whole opposite end is supported by a second cylinder mounting plate 27 upon the framework 11. The positioning cylinder 29 includes a conventional piston connected to an outwardly projecting piston rod 31 which in turn is connected to a table-positioning member 33. The forward end of the table-positioning member 33 extends through a guide 35 upon the cross brace 23 of the end of the elongated work support 20 nearer the bending station 331. The distal end portion of the table-positioning member 33 which is shown broken away at 39, FIG. 1B, is adapted for connecting physically to the bending station schematically represented at 331 of FIGS. 4, 5 and 13. Accordingly, actuation of the hydraulic cylinder assembly 29, 31 will locatably position the table frame 11 longitudinally with respect to the ram 38 of the bending station 331 of FIGS. 4, 13 and 15 so than any desired length of tubular workpiece 26 may be used.

The table frame 11 also includes a carriage slide support frame 45 connected at its end to the upright support 47 which is a part of the present work support 20. A base plate 49 has a pair of upright spaced side plates 51. The base plate 49 and the side plates 51 are connected to an upright index-mounting plate 53 which is suspended from the upper portion of the table frame 11. The base plate 49 supports a cylinder mounting block 55 which anchors one end of the second binary feed mechanism 34 of the present invention. The anchored end of the second binary feed mechanism 34 serves as a reference point from which the displacement of the opposite end of the binary feed mechanism 34 will be measured. The longitudinal axial movement of the upper end of the second binary feed mechanism 34 toward and away from the anchored end will result in different increments of feed being experienced by the longitudinal feed member or longitudinally adjustable rack gear 83 which is axially mounted upon the upper end of the second binary feed mechanism 34 for movement therewith. The rack gear 83 extends vertically upward through an upright retaining rail 79 connected to a mounting bracket 81 of a rotary actuator housing 89. The rack gear 83 extends up into the actuating housing 89 and is in mesh with a rack pinion 87, FIG. 1A. The rack pinion 87 is connected to a rotary socket 91 which is internally splined at 93. The upper end of the rack 83 movably extends into a tubular rack cover 85.

A horizontally disposed, elongated splined shaft 95 has one end nested within and secured to the rotary socket 91 and its opposite end projects toward the arbor assembly 24. The splined shaft 95 is supported within a bearing 99 of a spline support 100 which projects from table frame 11 as a part of the framework.

Figure 2:
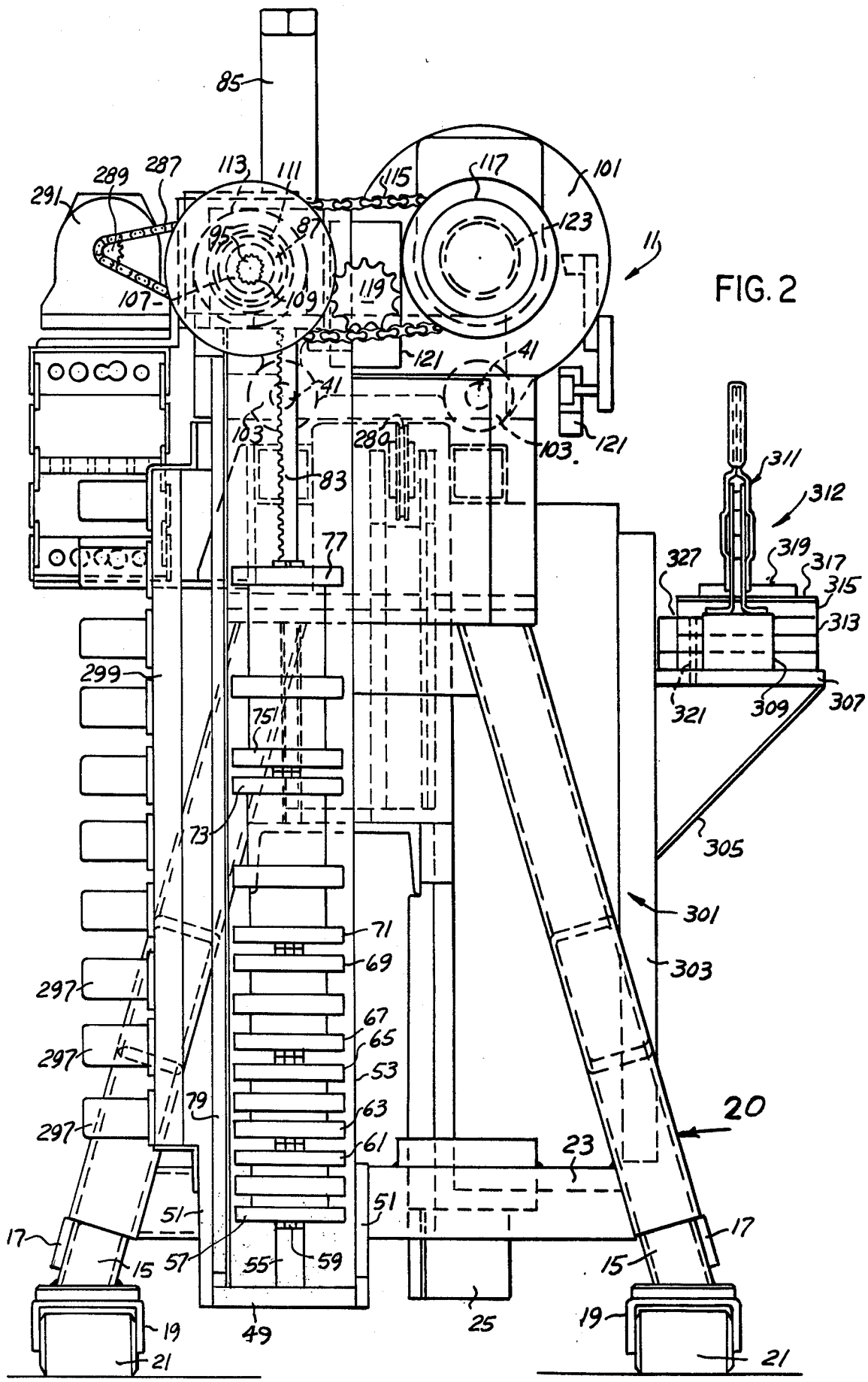
FIG. 2 is a left end elevational view of the elongated work support of FIG. 1A.
Figure 3:
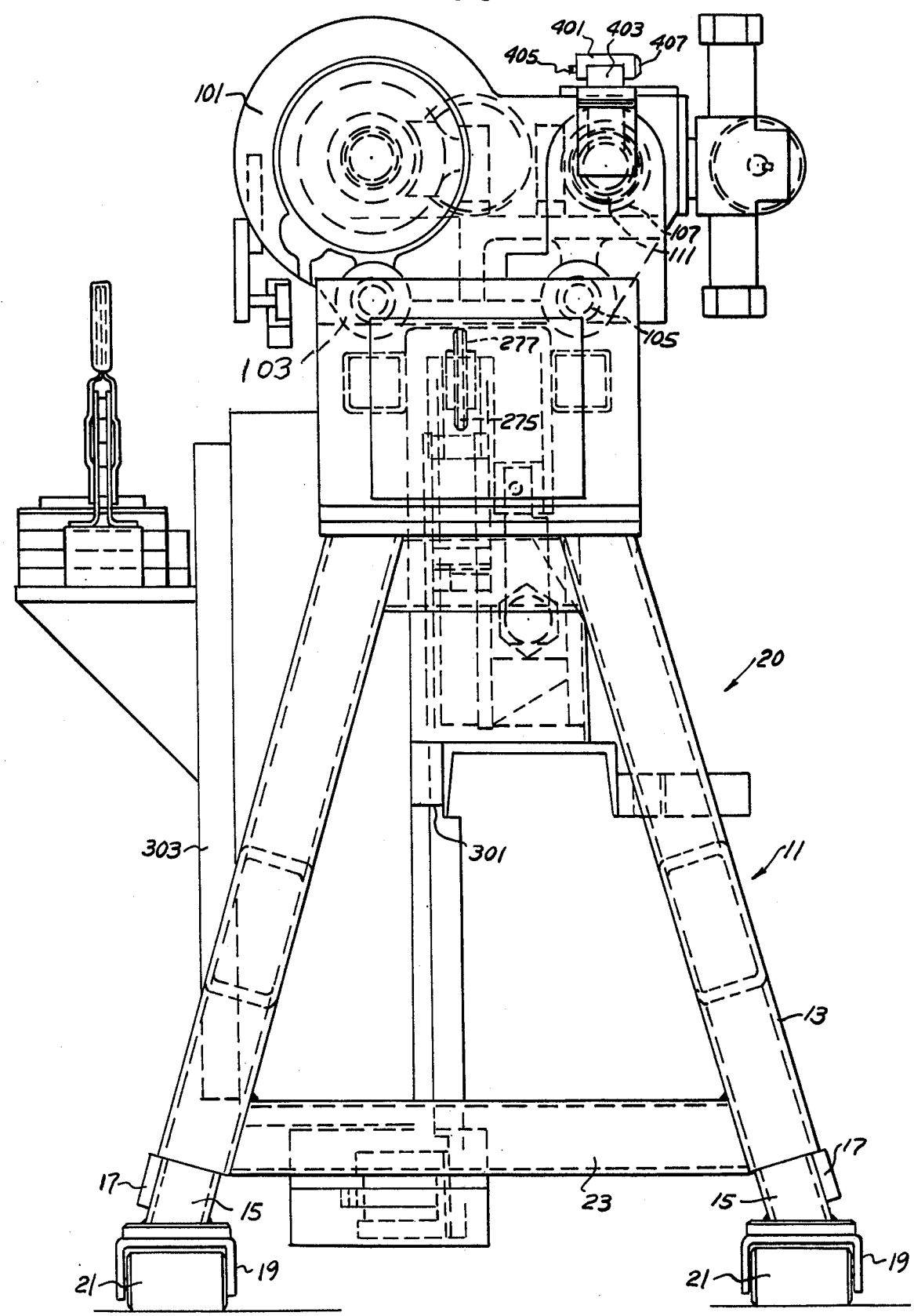
FIG. 3 is a right hand elevational view of the elongated work support of FIG. 1B.

The carriage assembly 22 includes a carriage housing 101 which has a pair of laterally spaced depending apertured bosses 103 which are slidably mounted upon a pair of arbor support shafts 41 with bearings 105 interposed. A tube rotation drum 107 (FIG. 2) is internally splined at 109 to operatively receive the rotatable spline shaft 95. The drum 107 is journaled within end bearings 111 in the carriage housing 101. The rotation drum 107 mounts a drive sprocket 113, FIG. 2, which is drivably connected via transverse sprocket chain 115 to a drive sprocket 117. The drive sprocket 117 is secured upon the tubular shaft 123 which is disposed through the carriage mounting plate 124. An intermediate tension sprocket 119 bears against the sprocket chain 115 and is adjustably anchored to the carriage housing 101 by a sprocket mounting plate 121 as shown in FIG. 2.

The rotatable tubular shaft 123 terminates in an enlarged boss 125 which is journaled in a bearing of the carriage housing 101. The enlarged boss 125 is axially connected to the main arbor 127 of the arbor assembly 24 so as to mount a tube rotation index plate 131. The index plate mounts a tube rotation drum 133 whose main arbor extension 135 is journaled through a bearing 137 within the carriage housing 101. The main arbor extension 135 projects into and is secured to the arbor extension tube 141. The arbor extension tube 141 FIG. 6 has a flange 143 at the end thereof which mounts the arbor assembly 24. The arbor assembly 24 also includes a cup retainer 145 joined to said flange 143 by means of fasteners 147. The arbor assembly 24 further includes a longitudinal bore 149 adapted to receive a longitudinally adjustable target cup 151.

The arbor 153, FIG. 1B and FIGS. 6, 7 and 8 is adapted for being nestably retained within the target cup 151, as shown in FIGS. 6 and 7. The arbor 153 is shown on an enlarged scale and in more detail in FIG. 10 and includes an elongated cylindrical body 155, which has a reduced portion 156 adapted to receive the tubular workpiece 26 which bears against the shoulder 157. The reduced portion 156 has a series of radially extending slots 159 which receive radially-extending, workpiece-anchoring fingers 185, FIG. 10, which are adapted to operatively engage the bore of the tubular workpiece 26 under the control of wedge 189.

The target cup 151 has an opposed pair of radial slots 163 which receive the arbor gripping fingers 161 which are pivoted to the cup 151 and 165, FIGS. 6–8, and terminate in arbor-retaining members 167. These arbor-retaining members 167 are adapted to extend into an exterior annular recess 168 upon the inner end of the workpiece-supporting arbor 153, FIG. 10.

The target cup 151 also has a central hub 169 with a longitudinally-oriented bore 171 terminating in a counterbore 173, FIG. 7. The fasteners 147 which anchor the arbor assembly 24 to the flange 143 of the arbor extension tube 141, also serve to guidably receive the target cup 151, as shown in FIG. 7, thereby limiting its motion to reciprocal longitudinal movements.

Referring to FIG. 10, the arbor 153 includes a spring guide 175 with a spring anchor 117 which engages a compressed stripper spring 179 within a bore 181 of arbor 153. The bore 181 terminates in a counterbore 183 within which is disposed the wedge 189 in operative engagement for the workpiece clamping fingers 185. A compression "O"-ring 187 is nested withinan annular groove (not shown) in the arbor extension 156 and is adapted to retainingly engage the workpiece clamping fingers 185, normally holding them radially inward with respect to the wedge 189.

Since there are times when the workpiece-supporting arbor 153 is moved longitudinally outward of the target cup 151, such as shown in FIG. 8, means are provided for supporting the arbor 153 in axial alignment therewith. For this purpose, an arbor retainer 191, FIG. 1B, has a concave top surface adapted to supportably receive the arbor 153, and terminates in a retainer bracket 193 which extends rearwardly and depends from support sleeve 195 which is slidably mounted upon the arbor extension tube 141. An adjustable collar 197 on the arbor extension tube 141 serves to limit the rearward movement of the support sleeve 195.

Referring to FIGS. 1A and 1B, a carriage mounting plate 124 is mounted upon carriage housing 101 and has a rearwardly extending spacer 201 supporting a cylinder-mounting plate 203 which supports an axially disposed hydraulic cylinder 205. The cylinder 205 includes a reciprocal piston with a piston rod 207 which, on the exterior of the cylinder 205, terminates in a body 209 which receives one end of an extension rod 211 anchored therein at 213. A disc-shaped switch actuator 215 is secured coaxial of extension rod 211 and bears against the body 209.

The extension rod 211 extends axially of and through the main arbor 127, the tube rotation drum 133 and the arbor extension tube 141 and projects into cup retainer 145 to terminate in a cam wedge 217, FIG. 6. Connected to the wedge 217 and projecting axially forward thereof is a control rod 219 which terminates in a cylindrical head 221, FIGS. 6, 7 and 8. The head 221 is movably nested within the bore 173 of the target cup 151 and is adapted to engage the shoulder 223 thereof, as in FIG. 6, for the purpose of retracting the target cup 151 from the position shown in FIG. 6 to the position shown in FIG. 8 on retraction of the extension rod 211 under the control of hydraulic retraction cylinder 205, FIG. 1.

When the extension rod 211 is retracted, as in FIG. 8, under the control of the retraction cylinder 205, the target cup 151 is in the retracted position within the cup retainer 145. The arbor-gripping fingers 161 are biased by their weight to the opened arbor release position shown in FIG. 8. FIG. 6 shows the relative positioning of the arbor 153 when positioned within the target cup 151, though not secured therein, with the fingers 161 in a released position. On initial forward movement of the extension rod 211, the wedge 217 engages the rear ends of the fingers 161 and initially moves the target cup 151 to the position shown in FIG. 6 outwardly of the cup retainer 145. In this position, the target cup 151 receives the rear end portion of the arbor 153. Further forward movement of extension rod 211 cams the wedge 217 with respect to the fingers 161, rotating the fingers 161 about the pivot point 165 from the position shown in FIG. 6 to the arbor-gripping position of FIG. 7. The wedge 217 then holds the fingers in this position as shown to clampably retain the arbor 153 within target cup 151 of the arbor assembly 24 by the arbor-retaining members 167.

After the predetermined longitudinal feed movement of the carriage housing 101 and the programably-controlled angular orientation of the arbor 153 and the retained tubular workpiece 26 to the desired polar position, the workpiece 26 is properly positioned before the bending station 331 of FIGS. 4, 13 and 6. In that condition, it is noted that the arbor stripping spring 179 is under compression so that the arbor 153 is held in the position shown in FIG. 7. Before the bending operation, it is necessary to disengage the arbor 153 from the target cup 152. For this purpose, energization of the hydraulic retraction cylinder 205 causes a retraction of the extension rod 211 which repositions the wedge 217 rearwardly of the fingers 161 so that by gravity or other biasing means, the fingers 161 return to the released position shown in FIG. 6. On continued retraction of the extension rod 211, the head 221 moves into the bore 173 of the target cup 151 to retract it from the position shown in FIG. 6 to the position shown in FIG. 8, and at the same time stripping the arbor 153 and its connected workpiece 26 for the bending operation.

The operation of the arbor rotation assembly 30 of the present invention is briefly described below. Once the arbor 153 is retained within the target cup 151, as shown in FIG. 7, and the tubular workpiece 26 has been clampably retained upon the arbor 151 by the action of the wedge 189 on the clamping fingers 185, the arbor rotation assembly 30 is able to rotate the arbor assembly 24 so as to properly orient the tubular workpiece 26 to the proper polar position with respect to the previously formed bends in the workpiece 26. The angular orientation is programably controlled by the punched card control system of FIG. 11, as hereinafter described, which controls the operation of the second binary feed mechanism 34 of FIGS. 1A, 2, 11 and 17 to effect the necessary rotation. Since one end of the second binary feed mechanism 34 is anchored via the cylinder-mounting block 55, the programmed actuation of predetermined one of the cylinder assemblies will cause a longitudinal feed movement having a programably predetermined binary displacement. The length of the displacement, i.e., the number of feed increments which the rack 83 is advanced or retracted, controls the amount of the angle through which the arbor assembly 24 is rotated. The rotation is accomplished by the operation of the rack gear 83 with the rack pinion 87. The longitudinal motion of the rack 83 causes the rack pinion 87 to turn the rotary socket 91 thereby rotating the splined shaft 95. Since the splined shaft 95 projects into the tube rotation drum 107, the rotation of the splined shaft 95 turns the drum 107. The rotation drum 107 mounts a drive sprocket 113 which operably turns the second drive sprocket 117 through sprocket chain 115. The second drive sprocket 117 is secured to a rotatable tube shaft 123 which extends through the carriage mounting plate 124 and is axially connected by a boss 125 to the main arbor 127 of the arbor assembly 24. The rotation of the main arbor 127 rotates the arbor extension 135 which is rigidly secured thereto via the index plate 131. And the arbor extension 135 projects into and is secured to the arbor extension tube 141 which rigidly mounts cup retainer 145 and the target cup 151 so as to properly orient the tubular workpiece 26 through an angle proportional to the longitudinal advancement of the race gear 83.

The carriage 22 and carriage advancement assembly 28 of the present invention will now be described with reference to FIGS. 1A and 1B. A pair of laterally spaced slide shafts 227 have their opposite ends anchored within supports 225 upon a carriage slideframe 45. A pair of spaced cylinder-mounting blocks 229 are anchored to a base plate 231 upon the carriage slide frame 45. The first binary feed mechanism 32 has one end anchored to the base support plate 231 so that its opposite end is free to move with respect thereto. The opposite end of the first binary feed mechanism mounts a longitudinal feed member or rack gear 255. The operation of the first binary feed mechanism 32 will be described hereinafter with respect to FIGS. 11 and 17. For present purposes, it is sufficient to say that the punched card control system of FIG. 11 is able to programably control the actuation of the first binary feed mechanism 32 so as to effect any desired number of feed increments of displacement of the rack gear 255.

A pair of retaining rails 253 are mounted upon a bracket 254 upon the carriage slide frame 45 and are adapted to guide the longitudinal reciprocal movements of the rack 255. The longitudinal rack gear 255 is axially secured to the non-anchored end of the first binary feed mechanism 32 and extends axially outward therefrom. The base portion of the rack 55 passes through an upright tie strap 257 which depends from a control rod 259 which projects from a hydraulic cylinder 261 which, in turn, is suspended by brackets 263 from the underside of the carriage housing 101.

The forward end of the rack gear 255 is in mesh with a pinion 265 mounted on a transverse shaft 267 which is journaled within a rotary actuator 269 upon a mounting bracket 271. A sprocket 272 is mounted on the shaft 267 for rotation therewith within the actuator 269. The sprocket 272 is associated with a no-motion switch 274. Each time the longitudinal motion of the rack gear 255 is complete, the pinion 265, transverse shaft 267, and sprocket 272 will stop rotation. This causes the no-motion switch 274 to output an electrical signal indicating that the longitudinal feed of the tubular workpiece 26 is complete. This electrical signal is effective to close a first normally-opened switch in a line supplying power to the actuator for the ram 38 of the bending station 331. This guarantees that there will be no operation of the ram 38 and hence no bending of the tubular workpiece 26 until longitudinal feed is complete.

The shaft 267 also mounts a pulley 273 upon the rotary actuator 269 around which extends a cable 275. The end portions of the cable 275 are threaded around respective pulleys 277 which are journaled upon supports blocks 279 at opposite ends of the table frame 11 adjacent and below the support shafts 41. The end portions of the cable 275 are connected to a cable anchor 280, FIG. 2, which is located upon the carriage housing 101. An adjustable mount 282 on the carriage housing 101 supports a limit switch actuator 281 which is adapted to engage a limit switch 284 on the table frame 11 when the last longitudinal feed movement is complete. When the final programmed longitudinal feed movement is complete, the limit switch 282 will be actuated by the limit switch actuator 281 to control (1) the return of the stepper switch selector arm 385 of FIG. 11 to the first stepping position or station so as to de-energize all of the solenoids 403 to deactuate the various cylinder assemblies of the first binary feed mechanism 32 and return the carriage 22 to the initial start position; and (2) the actuation of the hydraulic retraction cylinder 205 of FIG. 1A so as to cause the advancing rod 211 to move forward until the rod extension 219 engages the spring-loaded button 175 and advances wedge 189 to release the dogs 185 so as to release the tubular workpiece 26 from the arbor 153 leaving the carriage 22 free to return to the start position while leaving the tubular workpiece 26 at the bending station 331.

The rotary movement of the splined shaft 95 and the corresponding rotary socket 91 effects a similar rotation of sprocket 285, FIG. 1A, which drives sprocket 289 through sprocket chain 287. The sprocket 289, FIG. 2 is associated with a no-motion switch 291 such that each time the shaft 95 stops rotation, the no-motion switch 291 outputs an electrical signal indicating that the rotational orientation of the tubular workpiece 26 is complete. This electrical signal is effective to close a second normally-opened switch in the power line to the circuit which actuates the hydraulic cylinder 36 to extend the bending ram 38 to form the bend in the tubular workpiece 26. This guarantees that there will be no bending of the tubular workpiece 26 until the angular or polar orientation is complete. Since the first and second normally-opened switches are in series, we are guaranteed that both the longitudinal feed of the tubular workpiece 26 and its angular orientation must be completed before the hydraulic cylinder 36 which controls the operation of the bending ram 38 can be actuated.

In the preferred embodiment, a third normally-opened switch is placed in series with the first and second normally-opened series switches so that the hydraulic cylinder 36 of the bending arm 38 cannot be actuated until after the arbor 153 has been disengaged from the target cup 151 so as to allow the arbor 153 and the tubular workpiece 26 to move freely in the plane of the bend during each bending operation. The electrical signal required to close the third normally-opened switch could be generated by attaching a limit switch actuator or dog 210 to the rod 211 such that when the rod 211 is retracted as shown in FIG. 8 the dog 210, FIG. 1A, will contact a limit switch 212 mounted on the carriage housing 101 so as to generate the necessary electrical signal for closing the third normally-opened switch. In this manner, the bending operation cannot be actuated until the longitudinal positioning of the tubular workpiece 26; its radial orientation; and its release from the target cup 151 have been all completed.

The cylinder 261 FIG. 1A is, in actuality, a double piston rod cylinder with the piston rods 259 being connected to its piston and projecting from both ends of the cylinder. The cylinder 261 is filled with oil which passes through an orifice in the piston to smooth out the speed of the feed movements of the carriage 22 under the control of the powerful first binary feed mechanism 32.

Figure 17:
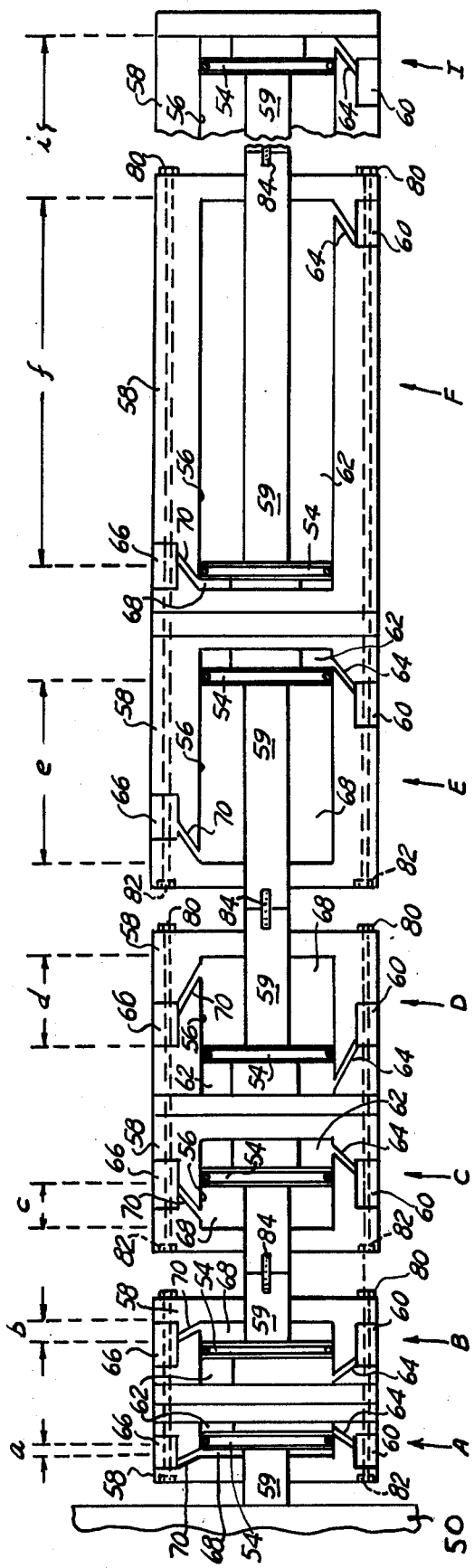
FIG. 17 is an illustrative side elevational view of the binary feed mechanism of the present invention, partly broken away.

As illustrated schematically in FIG. 11 and fragmentarily in section in FIG. 17, a typical binary feed mechanism will now be described. The binary feed mechanism includes a stack or series of cylinder assemblies A, B, C, D, E, F, G, H, and I. These cylinder assemblies are illustrated schematically in FIG. 11 and cylinder assemblies A, B, C, D, E, F, and part of I are shown in FIG. 17 for illustrative purposes only. It must be recognized that any number of cylinder assemblies may be employed to achieve any desired binary feeding increment or movement. These cylinder assemblies A-I are arranged in an axially aligned series so as to produce a longitudinal feed movement. Each of the cylinder assemblies A-I includes a piston 54 mounted on a piston rod 59 for reciprocal movement within a piston chamber 56 of a cylinder or cylinder housing 58. Each of the cylinder assemblies A-I includes an intake port 60 which communicates fluid pressure from a source of fluid pressure (not shown) to the intake portion 62 of the chamber 56 via an intake port passage 64. Similarly, each of the cylinder assemblies A-I includes an exhaust port 66 which connects ambient atmosphere to the exhaust portion 68 of the chamber 56 via an exhaust port passage 70. When not exhausting air, each of the passages 70 to cylinder A-I is connected by conduit 411 to a source of constant low air pressure 409, FIG. 11. This normally biases each cylinder assembly A-I to a retracted condition. This same source provides air under higher air pressure to each of the valves 405 through conduits 413. Each of the cylinder assemblies A-I has a discretely unique longitudinal length of piston stroke $a-i$, respectively, which defines the amount of total displacement or relative movement between the cylinder 58 of any given one of the cylinder assemblies A-I and its corresponding piston rod 59. These discrete stroke distances or lengths $a-i$ respresent discrete binary numbers and the cylinder assemblies A-I are arranged as to form a sequence of progression of these binary numbers according to the series $(2^0, 2^1, 2^2, \ldots 2^n)$, where "$n$" is any positive whole number.

The piston rod 59 of the innermost or lower end cylinder assembly A is rigidly anchored by means of its cylinder 58 or its piston rod 59. In the preferred embodiment, its piston rod 59 is rigidly connected to a mounting support 50 so as to define a point or plane of reference from which to measure the longitudinal displacement or outward movement of the distal end cylinder assembly I. The outward or distal end cylinder assembly I axially mounts a feed member such as rack 83 or rack 255 or a limit switch 44 or the like whose displacement with respect to the anchored cylinder assembly A defines various feed increments effected by the operation of the binary feed mechanism.

The series of cylinder assemblies A-I are coupled in an axially aligned end-to-end manner such that the actuation of any given one of the cylinder assemblies A-I, for example cylinder assembly C, causes it respective cylinder 58 to move with respect to its piston rod 59 so that a binary stroke length of "$c$" units of displacement is achieved in the present example. The coupling is such that all of the cylinder assemblies D-I outwardly of the actuated cylinder assembly C are moved or displaced outwardly with respect to the anchored end of the binary feed mechanism by a corresponding amount, i.e. by "$c$" feed increments or units of displacement in the present example. Furthermore, the cylinder assemblies A-I are connected such that the total movement or displacement, and hence the total number of feed increments effected by the outmost cylinder assembly I and the feed member or limit switch attached thereto, is equal to the cumulative total of the sum of all of the individual binary pistons stroke lengths $a-i$ of the cylinder assemblies A-I which where actuated.

In the preferred embodiment, the cylinder assemblies A-I are coupled end-to-end in a serial manner as described below in order to effect the above-mentioned movements. The cylinders 58 of the pairs ($n$ and $n+1$) of cylinder assemblies A and B; C and D; E and F; and G and H are rigidly secured together by means of a socket head screw 80 and jam nut 82 arrangement but any effective means of interconnection known in the art would do as well. Similarly, the piston rods 59 of alternate adjacent pairs ($n+1$ and $n+2$) of cylinder assemblies B and C; D and E; F and G; and H and I are rigidly connected together end-to-end by means of a threaded pin 84 or some similar fastening means known in the art.

In operation, the actuation of any given one or more of the cylinder assemblies A-I, for example cylinder assemblies A, B, D, and F, see FIG. 18, will cause the outermost cylinder assembly I and the feed member secured thereto to move longitudinally a total of 43 feed increments as follows. The actuation of cylinder assembly A causes it to move its cylinder housing 58 one binary unit or feed increments to the right since its piston rod 59 it rigidly secured or anchored to the support 50 and cannot move. The piston stroke length "$a$" is equal to the first binary number in the binary progression $(2^0, 2^1, 2^2, \ldots 2^n)$, which is the $2^0$ or 1's place number 38 or binary digit. This causes all of the cylinders assemblies B through I outwardly of cylinder assembly A to move a corresponding one binary unit to the right since all of the cylinder assemblies are secured rigidly together in and end-to-end manner through either their cylinder housings 58 or their pistons rods 59 as previously described.

The actuation of cylinder assembly B causes its piston rod 59 to move two binary units of feed to the right since its cylinder or cylinder housing 58 is rigidly secured to the cylinder 58 of cylinder assembly A. All cylinder assemblies outwardly thereof, C-I, will move a corresponding additional two feed increments outwardly to the right, as previously described. The binary stroke length "$b$" is equal to two binary units or increments of feed since it represents the second binary number in a series or progression ($2^0, 2^1, 2^2, \ldots 2^n$), which is the $2^1$ or 2's place number or binary digit.

The actuation of cylinder assembly D causes its piston rod 59 to be displaced eight feed increments to the right, hence all of the cylinder assemblies E thru I outwardly thereof move a corresponding eight units of feed further to the right. The piston stroke length "$d$" of the cylinder assembly D represents the binary number 8 since it is the $2^3$ or 8's binary digit in the sequence ($2^0, 2^1, 2^2, \ldots 2^n$).

And finally, the actuation of cylinder assembly F causes its piston rod 59 to move thirty-two binary feed increments in the outward direction. All cylinder assemblies G, H and I outwardly thereof move a corresponding 32 feed increments to the right, as previously described. The piston stroke length "$f$" represents 32 binary units of feed since it corresponds to the binary number 32 which is the $2^5$ or 32's place number or binary digit in the binary sequence previously cited.

Figure 18:
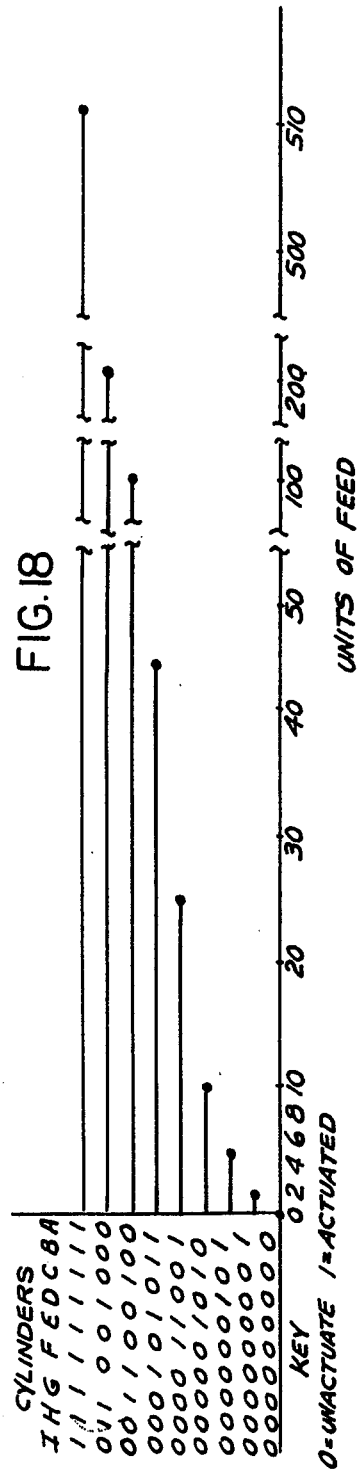
FIG. 18 is a graphical illustration of representative feed increments possible with the binary feed mechanism of the present invention and the status of the cylinder assemblies necessary to effect such feed increments.

As seen in FIG. 18, any number of binary feed increments or units of feed can be effected by adding additional cylinder assemblies to the stack. Additionally, for the cylinder assemblies A-I, any number of units of feed between 0 and 511 can be effected. It will be noted that there is a unique one-to-one correspondence between the number of feed increments desired and the combination of cylinder assemblies A-I which must be actuated in order to achieve this feed. FIG. 18 shows a few respresentative units of feed which may be desired and the unique combination of cylinder assembly actuations necessary to achieve it. It will be obvious to anyone skilled in the art or to anyone with the aid of any simple text on binary numbers, to selectively actuate the necessary combination of cylinder assemblies A-I to achieve any desired increment of feed between the 0 and 511 units. It will be recognized, that the unit length of the feed increment may be arbitrarily chosen depending on the degree of definition required for the particular application.

With this description of a typical binary feed mechanism of the present invention, the specific binary feed mechanisms 32, 34 and 48 will be described. The second binary feed mechanism 34 is used to control the longitudinal feed of the rack gear 83 of FIGS. 1A and 2 in order to programably control the angular orientation or polar position of the tubular workpiece 26, previously described. The second binary feed mechanism 34 includes a vertical stack of cylinder assemblies 57, 61, 63, 65, 67, 69, 71, 73 and 75 which correspond to cylinder assemblies A-I, respectively. The lowermost cylinder assembly 57, which corresponds to cylinder assembly A of FIG. 18, has its piston rod 59 rigidly secured to the cylinder mounting block 55 so as to define the point of reference represented by support 50 in FIG. 17. The longitudinal feed movement or outward displacement of the outermost end cylinder assembly 75 defines the total number of feed increments effected by the actuation of the various cylinder assemblies. The rack gear 83 is rigidly secured axially of the outermost end cylinder assembly 75 by some fastening means 77 such that the sum of the longitudinal feed increments experienced by the various cylinder assemblies A-I will effect corresponding longitudinal feed increments of the rack gear 83. As previously described, the rack gear 83 meshes with a rack pinion 87 to drive the splined shaft 95 which effects the desired radial orientation or polar positioning of the tubular workpiece 26. It will be noted that any desired number of feed increments may be effected by programably actuating the necessary combination of cylinder assemblies A-I to effect the same. If a predetermined number of feed increments are desired, for example, 43 feed increments, then cylinder assemblies 57, 61, 65 and 69 in the present example, as actuated to provide a positive feed increment of 43 units-no more and no less. No type of feedback system is required and the desired angular orientation is precisely controlled in a positive manner.

The first binary feed mechanism 32 includes a series of cylinder assemblies 233, 235, 237, 239, 241, 243, 245, 247, and 249, which correspond to the cylinder assemblies A-I, respectively of FIGS. 11 and 17. The anchored end of the first binary feed mechanism 32, which corresponds to cylinder assembly 233 has its piston rod 59 rigidly connected to a cylinder mounting support 231 which is vertically mounted on the horizontal frame member 45. The cylinder mounting plate 231 defines the reference point or plane from which the longitudinal feed movement or displacement of the opposite outward cylinder assembly 249 is measured. The longitudinal rack gear 255 is rigidly secured axially to the outward end of the cylinder assembly 249 by some type of fastening means 251. The cumulative total of the individual binary piston stroke lengths of the individual cylinder assemblies will effect a longitudinal outward movement of the rack gear 255 to the right. The rack gear 255, as previously described, will control the positioning of the carriage 22 thereby controlling the longitudinal positioning of the tubular workpiece 26 with respect to the bending station 331.

A third binary feed mechanism 48 is used to programably control the positioning of a limit switch 371, which corresponds to the limit switch 44 of FIG. 13, to control the depth of the bend formed in the tubular workpiece 26. The bending station or vertical press is schematically shown at 331 in FIGS. 4, 5 and 13 and may include the apparatus of FIG. 16 or its equivalent. The specific construction of the vertical press or bending station 331 is conventional and includes a vertically reciprocal power ram 38 which is reciprocated by a hydraulic cylinder 36 under the control of a four-way valve 456, FIG. 13. The four-way valve 456 is controlled by a solenoid 458 which, in its normal position, is biased so as to control the valve 456 in such a manner as to direct fluid pressure into the hydraulic cylinder 36 for normally elevating and maintaining the ram 38 with respect to the wing dies 42, FIG. 16, into a normally retracted position. Once the first, second and third normally-opened switches in the power line to the actuating solenoid 458 are closed, indicating that the longitudinal feed of the tubular workpiece 26; its angular orientation; and its ejection from the target cup 151 are completed, the solenoid 458 will actuate valve 456 and the hydraulic cylinder 36 to extend the power ram 38 toward the tubular workpiece 26 for forming a bend therein. The positionable limit switch 371 will be actuated in response to the predetermined depth of bend having been achieved to immediately terminate the extension of the power ram 38 and cause the hydraulic cylinder 36 to restore the power ram 38 and its bending die 40 to the normally-retracted position. The details of the vertical press or bending station of the present invention are conventional and may be similar to those shown in the U.S. Pat. Nos: 3,505,852 which issued on Apr. 14, 1970; 3,362,209 which issued on Jan. 9, 1968; 3,306,093 which issued on Feb. 28, 1967; and 3,344,639 which issued on Oct. 3, 1967, all of which issued to Frank Sassak, the Applicant of the present invention, and all are incorporated by reference herein.

In one illustrative form of bending station a power ram 38 having a bending die 40 connected to one end thereof reciprocates with respect to a bed 453 as shown in FIG. 16. A pair of wiper die holders 455 are pivoted at 461 on an axis at a right angle to the movement of the bending die 40. Holders 455 mount the workpiece holding die inserts 459. FIGS. 14–16. The downward movement or extension of the ram 38 with respect to the die holders 455 causes a bending of a tubular workpiece 26 and a simultaneous pivoting of the holders 455 about their rotary supports 461.

A corresponding die support 455 is shown in FIGS. 5, 14 and 15. The extent of downward bending effects a corresponding rotation of the die support 455 within the bearing 463. A sprocket gear 465 is connected to the die support 455 via rotary support 461. The rotation of the support 461 and the sprocket gear attached thereto drives a chain 467 which in turn drives a sprocket 469 mounted upon the press 331. The rotation of the sprocket 469 rotates a shaft 471, FIG. 4, which mounts a pinion 473 in mesh with a rack gear 357. When the die support 455 is rotated to a predetermined angle corresponding to the predetermined programed depth of bend, it will have caused a proportional downward movement of the vertically-oriented rack gear 357 causing the lower distal end of the rack 357 to engage limit switch 371. When the limit switch 371 is engaged by the distal end of the rack gear 357, it generates an electrical signal which actuates the solenoid 458 of FIG. 13 to cause a reversal of the four-way valve 456. This causes a flow of hydraulic fluid pressure from a pressure source, P, into the hydraulic cylinder 36 causing an instantaneous termination of the downward stroke of the ram 38 and a retraction of the ram 38 and its bending die 40 to the normally retracted position.

A limit switch 400 may be mounted to the press 331 and a limit switch actuator 402 may be mounted to the ram 38 or to the piston rod of the hydraulic cylinder 36 so as to cause the actuation of the limit switch 400 upon the return of the ram 38 to its normally-retracted position. This limit switch 400 generates a signal indicative of the termination of a bending operation and the signal may be used to step the rotary stepper switch 385 of FIG. 11, as known in the art.

The vertical positioning of the limit switch 371 so as to determine the depth of the bend as described hereinabove is postively controlled by the third binary feed mechanism 48. The third binary feed mechanism includes a plurality of cylinder assemblies 341, 343, 345, 347, 349, 351, 353, and 355 which corresponds to cylinder assemblies A–H of FIGS. 11 and 17. The operation of these binary cylinder assemblies are under the programed control of a punched card control system, such as the one shown in FIG. 11. For each bending operation, the amount of displacement of the binary feed mechanism 48 required to properly locate the limit switch 371 to achieve the desired depth of bend can be successively encoded on a punched card so that the proper depth of bend is achieved for each of the bends formed along the length of the tubular workpiece 26. Once the desired depth of the bend has been programmed, the third binary feed mechanism 48 will positively position the limit switch 371 to the proper position. When the hydraulic cylinder 36 is actuated to extend the power arm 38, the bending die 40 will form the bend in the workpiece 26. As the bend is formed, the wing die 455 will rotate in proportion to the vertical displacement of the power ram 38 and hence in proportion to the depth of the bend. Since the rotation of the wing die 455 lowers the rack gear 357, the distal end of the rack gear will engage the limit switch 371 when the proper depth of bend has been achieved. At this point the limit switch 371 will generate an electrical signal to operate the solenoid 458 causing the valve 456 to direct fluid pressure into the hydraulic cylinder 36 causing it to terminate its downward motion and immediately return the ram 38 to the normally-retracted position.

Referring to FIGS. 4 and 5, mounting brackets 333 are suitably connected to the press 331 and mount a support plate 335 which adjustably supports a cylinder mounting plate 337. A block 338 is adjustably positioned relative to the cylinder mounting plate 339 and used to anchor, at 339, the piston rod extension 340 of the lowermost cylinder assembly 341. The outward or uppermost cylinder assembly 355 mounts the limit switch 371 and the position of the limit switch is determined by its displacement with respect to the anchored cylinder assembly 341, as previously described. In the present example however, the individual cylinder assemblies of the third binary feed mechanism 48 are normally actuated or fully extended, so that in the normal case, the outermost cylinder assembly 355 and the limit swtich 371 positioned thereon are maximumly displaced with respect to the anchored cylinder assembly 341. The individual cylinder assemblies are therefore actuated or deactuated as the case may be to cause a retraction or lowering of the outermost cylinder assembly 355 thereby increasing the distance the rack 357 must be lowered to actuate the limit switch 371.

A standard 361 may be pivotally mounted as at 363 to the support plate 335 and a bracket 369 may be anchored to the uppermost cylinder assembly 355 to rigidly secure the limit switch 371 thereto so that the plunger contact 373 of the limit switch 371 projects axially above and longitudinally away from the upper end of the outward cylinder assembly 355. The vertical downward movement of the rack 357 effects a corresponding downward movement of the stop nut 375. It engages the limit switch contact 373 and actuates the limit switch 371. The operation of the third binary feed mechanism 48 to position its outermost cylinder assembly 355 incrementally inward instead of outward makes no difference in the operation of the mechanism. The binary feed mechanism 48 still operates to achieve the various programmed binary feed increments in accordance with the discription of FIG. 17 previously given except that the actuation of the individual cylinder assemblies causes a retraction rather than an extension of the piston rods 59 relative to the cylinder housings 58.

For each of the cylinder assemblies of the binary feed mechanisms 32, 34 and 48, there are a corresponding number of solenoid control valves 297, FIG. 2, which are shown schematically at 403, 405 in FIG. 11 with the identifying letters A1. These solenoid control valves 297 for the respective cylinders of the first binary feed mechanism 34 are mounted upon the upright bracket 299 of FIG. 2.

As shown in FIG. 2, one side of the table frame 11 includes a panel mounting assembly 301 which supports an electrical panel 303. Mounted upon the panel 303 is a card holder 312 schematically shown in FIG. 11. For this purpose, a support bracket 305 is provided which extends from the electrical panel 303 and includes a base plate 307 for supporting a clamp mounting block 309 supporting a hand toggle clamp 311. The card holder 312 includes a plunger housing or base 313 which corresponds to the card holder base plate 313 of FIG. 11 and the schematic representation of the card holder 312 therein. The contact housing 315 of FIG. 2 corresponds to the top plate 315 of FIG. 11 which mounts a series of laterally spaced elongated power strip contacts or bus bars 325. The top cover plate 317 overlies the contact plate 315 which is hinged to the base plate 313 as in 327. The top plate 319 overlies and is secured to the cover plate 317 to provide the means by which, when the plate 315 has been hinged into registry with the base plate 313, the clamp 311 will secure the cover plate 317 into registry with a suitable punch card 329. FIG. 12, interposed therebetween for operation in the manner hereinafter described.

Plate 313 is suitably anchored to the base plate 307 by corner fasteners 321. As shown in FIG. 11, the contact housing or plate 315 mounts upon its upper surface a series of elongated parallel spaced power contacts 325 which are additionally identified by the numbers 1 thru 10 corresponding to the stations 1 thru 10 of the rotary stepper switch 381. When the selector arm 385 of the stepper switch 381 has been rotated to the number 3 station, for example, power will be supplied via lead 387 to only the number 3 power contact 325, as known in the art. In actuality, there are three sets of these card holders 312 corresponding to the three separate punched card control systems required to operate the first, second and third binary feed control mechanisms 32, 34, and 48, respectively.

The punched card control system of the present invention will now be described with reference to FIG. 11 which is merely a schematic diagram of the present punched card control system. FIG. 11 shows a rotary stepper switch 381 which has provided thereon a series of stepper stations 1-10 indicated generally by the reference numeral 383. Each station includes a stepping switch contact 389, and the stepping switch 381 includes a rotatable selector arm or stepper arm 385 which is rotatable about the pivot point 386. The pivot point end 386 of the rotatable contact 385 is connected via lead 388 to a source of electrical potential or power 390. The rotatable stepper arm 385 moves from station to station to complete a current path between the source of potential 390 and the individual stepper switch contacts 389 of each of the stations 1 thru 10. A plurality of electrical leads 392 connect individual ones of the stepper switch contacts 389 to corresponding individual power column contacts 393 in the vertical power column indicated generally as 387. There are ten of the power contacts 393 in the power column 387 and each of these is connected via lead 392 to the respective selector switch contact 389 of the stepper switch 381. As the rotatable stepper switch arm 385 moves from station to station, a current path is formed between the source of potential 390 and one of the individual power contacts 393 of the power column 387 via lead 388, the stepper arm 385, the stepper contact 389, and lead 392.

The card holder-reader 312 includes a base portion 313 which is hingeably connected via a hinge means 327 to a top portion 315. The bottom portion includes a 10 by 10 contact matrix as described hereinbelow. There are ten vertically-oriented columns of electrical contacts corresponding to the nine solenoids A-I, with the tenth column being the power column 387. Each of the connector points 323 includes an aperture or hole formed in the base 313 and each of the apertures houses a protruding contact or plunger 323 which is biased so as to slightly protrude above the surface of the base 313 to protrude through the punched holes in a card 329 placed thereover. The power column 387 includes ten discrete power column contacts 393 and each are connected by a lead 392 to individual stepping switch contacts 389 as previously described. For each one of the power contacts 393 in the power column 387, there is a corresponding horizontal row of the contacts 323 corresponding to the solenoids A-I. Each of the contacts 323 are connected together in a given column A-I and a plurality of leads 395 connect the corresponding interconnecting column A-I to corresponding ones of the solenoids 403 for energization thereof. There is no interconnection between the connections 323 within a row, only within a column. The cover plate 315 of the card holder 312 includes 10 parallel elongated conductor strips or bus bars 325, one for each of the ten stations or horizontal rows of the base 313. The length of the individual bus bars 325 and the spacing is such that when the cover 315 is hingeably closed over the base 313, the ten conductive strips 325 serve to reside directly over the corresponding rows of protruding connectors 323 so as to complete a horizontal power connection to selected points across any given row.

In operation, as the selector arm 385 of the rotary stepping switch 381 is moved from one station to the next, for example from station two to station three, a conductive path is established between the source of potential 390 and selected ones of the solenoids 403 so as to actuate predetermined ones of a cylinder assemblies A-I. The movement of the rotary switch 385 from station two to station three completes a conductive path between the number 3 power contact 393 of the power column 387 and the source of potential 390 via lead 388, the stepper switch arm 385, and the lead 392. When the lid or top 315 is closed over the base 313, the number 3 horizontal conductive strip 325 closes over the third horizontal row of protruding contacts 323 of the base 313. Assuming that a programed card, 329, as shown in FIG. 12, is inserted over the base 313 before the top 315 is closed, any apertures included in the third row will allow the protruding contacts 323 to pass therethrough so that a path is completed between the hot power contact 393 through the third conductive strip 325 of the top 315 and then through the protruding contact 323 to the corresponding desired solenoids 403 via lead 395.

As an example of the operation of the punched card control system of FIG. 11, consider the punched card sample 329 of FIG. 12 which may, for example be used to control the radial orientation of the second binary feed mechanism 34 of the present invention. It will be noted that none of the cylinder assemblies A-I are operated during the first, second, and fourth, fifth, seventh, and ninth switch positions or operations indicating that it was not necessary to change the orientation of the tubular workpiece 26 from that previously established during those operations. It will be similarly noted that the orientation is changed during the third, sixth, eighth, and tenth positions. As previously indicated, the actuation of cylinder assemblies A, B, D, and F results in 43 binary feed increments. When the rotary arm 385 of the stepper switch 381 reaches the number 3 station, and the top 315 of the card holder-reader 312 is lowered over the punch card of FIG. 12 which is placed in an operable position over the base 313, a conductive path is established between the source of potential 390 and the A, B, D, and F solenoids 403 of FIG. 11. As previously described, this causes the solenoids 403 to actuate the corresponding valves 405 so as to actuate the corresponding cylinder assemblies A, B, D, and F so as effect the desired 43 units of feed.

The A, B, D and F solenoids 403 are actuated electrically since a current path is established from the current source 390 through lead 388, the stepper arm 385, the number 3 station contact 389, lead 392, the number 3 station power contact 393 of the base 313, the third conductive strip 325 of the top plate 315, the A, B, D, and F protruding contacts 323 of the third row of the base 313 and the respective A, B, D and F leads 395 to the corresponding solenoids 403. Similarly, when the stepper switch 381 has its arm 385 in the number 6 position, the D cylinder assembly will be actuated; when in the number 8 position, the A and H, cylinder assemblies will be actuated; and when in the tenth position, the B cylinder assembly will be actuated.

It will be observed that the punched card control system of FIG. 11 cannot be operated until the card has been inserted onto the base 313 and the top 315 has been closed thereover so as to enable the power contacts to be connected to the desired protruding contacts 323 which protrude upwardly through the punched holes or apertures 419 of the program card 329. The protruding contacts 323 which do not have an aperture 419 through which to protrude are merely biased against the under side of the punched card and cannot complete an electrical circuit between the power strip 325 and the corresponding solenoid 403 associated therewith.

The rotation of the selector arm 385 of the stepper switch 381 moves from one station to the next under the control of electrical stepping signals generated by the actuation of the limit switch 400 FIG. 13, which is actuated each time the ram 38 returns to its normally-retracted position, as previously described. Similarly, when the limit switch 400 is actuated, signifying that the ram 38 has returned to its normally-retracted position, and the limit switch 284, FIG. 1B, is actuated, indicating that the last longitudinal feed has been completed, the stepper switch arm 385 will be returned to the first position to await the insertion of the next punched card 329, or re-use of the same card for repeat bending of additional tubes.

It will be observed that any programed sequence of operations can be achieved with the present invention. A first program control system similar to FIG. 11 can be used to program the longitudinal feed movements necessary to properly position a tubular workpiece 26 before a bending station 331 so that bends can be formed at predetermined selected locations along the length thereof. A second punched card control system similar to FIG. 11 can be used to program the sequence of orientations necessary so that each of the bends formed in the tubular workpiece 26 has the proper polar orientation with respect to the previously formed bends. Further, a third punched card control system similar to FIG. 11 can be used to sequentially program the desired depth of each of the bends to be formed along the length of the tubular workpiece 26. The operation is sequenced so that the tubular workpiece 26 is longitudinally advanced to a first location, oriented, and bent to a desired depth. At the completion of this first bending operation, the tubular workpiece 26 is again longitudinally advanced to position the location of the next desired bend before the bending station; it is automatically oriented to the desired polar position of the bend; and the bend is then formed to the proper depth. This sequence continues until all of the bends to be formed along the length of the tubular workpiece 26 have been completed. Upon completion, the stepper switch 381 returns its arm 385 to the first station, and the machine can be programed for the next sequence of operations on the next workpiece. For a repeat the same card is used.

The punched card control system of FIG. 11 insures that any desired amount of feed can be achieved under programmed control. The binary feed mechanisms 32, 34 and 48 have selected cylinder assemblies actuated to effect the desired feed increment for each of the operations i.e. longitudinal feed, rotational orientation, and depth of bends, in a positive manner without the use of any type of feedback system. The actuation of the proper combination of cylinder assemblies insures a positive feed movement of exactly the desired number of units, no more and no less. This enables all of the necessary parameters, longitudinal feed, polar orientation, and depth of bend to be programably controlled accurately so as to totally automate the tube-bending operation without any loss in accuracy. The present system is relatively error free, is relatively easy to maintain, and has a relatively low cost compared to the more sophisticated systems of the prior art which use elaborate feedback systems to terminate the feed movements. Hence a highly accurate and dependable system is provided at a relatively low cost so that tube-bending operations, and indeed any type of operation involving programable feed movements, can be effected efficiently, accurately and economically.

Although specific apparatus has been disclosed for describing an illustrative embodiment of the present invention, it will be readily apparent to those skilled in the art that various modification may be made without departing from the spirit and scope of the present invention which is limited only by the appended claims.

I claim:

1. A binary controlled tube bending apparatus for programably forming a plurality of bends at predetermined spaced locations along the length of a tubular workpiece, each of said bends having a predetermined radial orientation with respect to any other bend and each having a predetermined depth of bend, said apparatus comprising:

an elongated work support;
a bending station mounted at one end of said support and having a movable bending die, the depth of the bend formed in said workpiece being determined by the amount of displacement of said bending die with respect to a normal position;

a carriage slidably mounted on said work support for reciprocal movement toward and away from said bending station;

a rotatable arbor assembly mounted on said carriage for movement therewith, said arbor assembly releasably clamping said workpiece during said longitudinal positioning and radial orienting operations;

a first program storing information relating to the number of longitudinal feed increments which said workpiece must be advanced to properly position the next sucessive predetermined bend location at the bending station;

a first circuit means for reading said stored information and generating a plurality of control signals representative thereof;

a first binary feed mechanism having a feed member and a plurality of cylinder-piston assemblies, each of said assemblies having a different length piston stroke representing a different binary number, said assemblies being serially coupled to said feed member and responsive to said plurality of control signals for actuating different ones of said assemblies for cumulatively adding the sum of said binary piston strokes to advance said feed member a predetermined programed number of longitudinal feed increments;

a longitudinal feed assembly coupled to said carriage and responsive to the advancement of said feed member for longitudinally positioning said workpiece so as to position the next successive predetermined bend location before said bending station;

a second program storing information relating to the radial orientation of the next successive bend with respect to the previous bend;

a second circuit for reading said stored information and generating a plurality of rotational control signals representative thereof;

a second binary feed mechanism having a feed member and a plurality of cylinder-piston assemblies, each of said assemblies having a different length piston stroke representing a different binary number, said assemblies being serially coupled to said feed member and responsive to said plurality of rotational control signals for actuating different ones of said assemblies for cumulatively adding the sum of said binary piston strokes to advance or retract said feed member a predetermined programed number of rotational feed increments;

an arbor assembly rotating means responsive to the advancing or retracting of said feed member to rotate said workpiece to said predetermined programmed radial orientation;

a third program storing information relating to the predetermined depth of a given bend to be formed in the workpiece;

a third circuit for reading said stored information and generating a plurality of depth limit control signals;

a positionable limit switch responsive to said movable die having attained a predetermined position with respect thereto for deactivating said bending die and re storing it to said normal position; and a third binary feed mechanism mounting said limit switch and having a plurality of cylinder-piston assemblies, each of said assemblies having a different length piston stroke representing a different binary number, said assemblies being serially coupled and responsive to said plurality of depth limit control signals for cumulatively adding the sum of said binary piston strokes to position said limit switch to a predetermined location so as to terminate bending when said predetermined programmed depth of bend is attained.

2. In an apparatus for automatically orienting a tubular workpiece such that a given portion in which a bend is to be formed at a bending station is rotated to a predetermined polar position with respect to the orientation of a previously formed bend, said apparatus having a work support frame spaced from said bending station, a carriage slidably mounted on said frame for reciprocal movement toward and away from said bending station, an arbor assembly mounted on said carriage for reciprocal movement therewith, said arbor assembly including a rotatable arbor for releasably retaining said tubular workpiece and drive means for rotating said arbor assembly to orient said retained workpiece, the improvement comprising:

a longitudinally positionable feed member for controlling said drive means;

a plurality of cylinder assemblies arranged in an axially aligned series defining the longitudinal axis of said feed member, each of said assemblies having a piston, a piston rod and a cylinder, the length of the piston stroke of each of said assemblies defining the relative movement between its cylinder and its piston rod and each of said assemblies having a discrete length of piston stroke representing a discrete binary number, said series being arranged to form a progressive sequence of the binary numbers ($2^0, 2^1, 2^2, \ldots 2^n$), one of the end assemblies in said series being rigidly anchored to define a longitudinal feed reference and the outward distal end assembly being connected to said feed member, said assemblies in said series being coupled end-to-end such that the relative movement between any given cylinder and its piston rod effects a corresponding movement of all assemblies outwardly thereof and the total longitudinal movement of said feed member is the cumulative sum of all of the individual binary piston stroke lengths of the actuated assemblies;

a source of fluid pressure;

a program storing information representing the predetermined amount of angular rotation necessary to properly orient said workpiece with respect to the previously formed bend;

electrical means for reading said stored information and generating control commands representative thereof; and a plurality of electrically controlled fluid pressure valves, one for each of said cylinder assemblies in said series, said valves communicating said assemblies with said source of fluid pressure and responsive to said control commands for operating selected ones of said valves to actuate corresponding selected ones of said assemblies to effect a longitudinal movement of said feed member necessary to rotate said arbor to orient said retained workpiece to said predetermined polar position.

3. In a programably controlled machine for forming a plurality of bends along the length of a tubular member, said bends being located at predetermined spaced intervals and each having a predetermined radial orientation with respect to the previously formed bend, said machine having a bending station for forming said bends, a work support spaced from said bending station, a carriage slidably mounted on said support for reciprocally moving toward or away from said bending station, carriage drive means for advancing said carriage, an arbor assembly mounted on said carriage for reciproval movement therewith, said arbor assembly including a rotatable arbor for releasably clamping said tubular member, and means for rotating said arbor to orient said clamped tubular member, the improvement comprising:

program means storing a first coded information group representing the predetermined longitudinal distance which said tubular workpiece must be advanced to properly position the next successive portion along its length at which a bend is to be formed in operative position before said bending station and a second coded information group representing the predetermined angle through which said tubular member must be rotated to properly orient the next successive bend with respect to the previous bend;

circuit means for reading said first and second coded information groups and generating first and second sets of control signals representative thereof;

a first binary feed control having a longitudinal feed member whose longitudinal displacement controls the operation of said carriage drive means, said feed control having means for defining a plurality of discrete binary feed increments, each of said defined increments representing a different successive binary number in the series ($2^0, 2^1, 2^2, \ldots 2^n$), said binary feed control being responsive to said first set of control signals for effecting selected ones of said defined feed increments to properly advance said tubular member said predetermined longitudinal distance; and a second binary feed control having a longitudinal feed member whose longitudinal displacement controls the operation of said arbor rotating means, said feed control having means for defining a plurality of discrete binary feed increments, each of said increments representing different successive binary number in the series ($2^0, 2^1, 2^2, \ldots 2^n$), said binary feed control being responsive to said second set of control signals for effecting selected ones of said defined feed increments to properly position said feed member to rotate said tubular member through said predetermined angle for proper orientation.

4. In a bending machine for forming a plurality of bends along the length of a tubular workpiece, each of said bends having a predetermined depth of bend, said machine having a reciprocal ram adapted for movement in a direction normal to the longitudinal axis of the workpiece, a bend-forming die mounted on one end of said ram, secondary die means cooperable with said bending die to form said bends, the depth of each of said bends being determined by the displacement of said ram from a normally retracted position, hydraulic means normally biasing said ram in said normally retracted position, a hydraulic valve operable to actuate said hydraulic means and extend said ram from said normally retracted position, said valve also being operable to deactuate said hydraulic means to terminate the extension of said ram and restore it to said normally retracted position, and a positionable limit switch triggerable to a limit state wherein said switch operates said valve to deactuate said hydraulic means, the improvement comprising:

program means for storing information representing the predetermined displacement of said ram necessary to effect a desired depth of bend;

circuit means for reading said stored information and generating stroke-limiting command signals representative thereof;

binary positioning means for positioning said limit switch, said positioning means including a plurality of cylinder assemblies arranged in an axially aligned series, each of said assemblies having a piston, a piston rod and a cylinder, the length of the piston stroke of each of said assemblies defining the relative movement between a given piston rod and its cylinder, each of said assemblies having a discrete length of piston stroke representing a discrete binary number, said series being arranged to form a progressive sequence of the binary numbers ($2^0, 2^1, 2^2, \ldots 2^n$), one of the end assemblies in said series being anchored to define a positioning reference and the outward distal end assembly being adapted to mount said limit switch, said assemblies in said series being coupled end-to-end such that the actuation of any given assembly causes relative movement between its piston rod and its cylinder, the amount of said movement being equal to the binary number it represents, said movment effecting a corresponding movement of all of said assemblies outwardly of said actuated assembly, and such that the total movement of said limit switch-positioning end assembly with respect to said reference is equal to the cumulative sum of all of the individual stroke lengths of the assemblies actuated;

a source of fluid pressure;

a plurality of fluid pressure control valves, one for each of said assemblies in said series, communicating said assemblies with said source of fluid pressure, said valves being responsive to said stroke-limiting command signals for operating selected ones of said valves to actuate corresponding selected ones of said assemblies to position said limit switch a predetermined distance from said reference; and switch-engaging means responsive to the actual displacement of said ram from said normal position for moving a distance proportional to the displacement of said ram to trigger said limit switch to said limit state when the predetermined desired depth of bend has been attained.

5. In a tube-bending machine having a work support, a bending station at one end of said work support, a carriage mounted on said work support for reciprocal movement toward and away from said bending station, an arbor assembly mounted on said carriage for movement therewith, said arbor assembly including means for releaseably retaining a tubular workpiece, means for advancing said carriage to longitudinally position said workpiece before said bending station for forming bends at spaced intervals along its length and means for rotating said arbor assembly to angularly position said workpiece before said bending station so as to properly orient the polar orientation of the bend with respect to previously formed bends, an improved workpiece retaining means for said arbor assembly comprising:

cup means including cam-operated means for engagably extending and releasably retracting a gripping member;

an arbor having one end adapted for insertion into said tubular workpiece for expandably gripping same, the other end of said arbor being adapted for nesting within said cup means and for being releasably retained therein by said engagable extension of said gripping member; and reciprocal means longitudinally positionable within said cup means to a first position for camming said gripping member into said engagably entending position to releasably retain said arbor nestably within said cup means and to a second position for enabling said gripping member to return to said releasably retracting position and withdraw said cup means from about said arbor to releasably expel the same.

6. In a control mechanism for feeding and orienting tubular workpieces with respect to a vertical press or other tool;

a framework spaced from said press;

a pair of parallel spaced slide support shafts on said framework;

a reciprocal carriage slidably mounted on said shafts;

an elongated splined shaft at its ends rotatively mounted on said framework and extending through said carriage;

an internally splined drive assembly journalled upon said carriage and operatively receiving said splined shaft;

a main arbor assembly journalled upon said carriage including a driven means connected to said drive assembly;

arbor mounting means on said arbor assembly;

an arbor at one end removably mounted upon said arbor mounting means and at its other end adapted to receive and support a tubular workpiece;

a pinion secured to said splined shaft;

a longitudinally reciprocal rack in mesh with said pinion;

a remote controlled selectively operable binary feed means on said framework and connected to said rack for effecting intermittent varying longitudinal movements thereof and corresponding rotary movements of said splined shaft, for orienting said arbor intermittently to different angular positions throughout 360°;

a selectively operable feed mechanism mounted upon said framework and connected to said carriage for effecting corresponding and intermittent longitudinal movements thereof and the arbor thereon;

a control cylinder assembly with reciprocal piston and piston rod mounted upon said carriage rearwardly and axially of said main arbor;

an extension rod axially connected to said piston rod and extending axially through said main arbor assembly and into said arbor mounting means;

and control means on said extension rod for alternately anchoring the arbor within said arbor mounting means during feed and orientation and for ejecting the arbor therefrom during operation of said press.

7. In the control mechanism of claim 6, said arbor mounting means including a cup retainer secured upon the end of said arbor mounting means;

a target cup axially nested in said cup retainer and longitudinally adjustable therein;

and a pair of opposed arbor-retaining cam fingers pivoted upon said target cup normally biased to an open arbor release position;

said control means on said extension rod including a wedge adapted on forward longitudinal movement to advance the target cup to receive said arbor and to successively cam said fingers to a closed position retainingly engaging said arbor.

8. In the control mechanism of claim 7, said control means further including a control rod extending through said cup retainer and into said target cup and having a head retainingly engaging said target cup whereby, on retraction of said extension rod, wedge and head, said fingers are released by said wedge and said head retracts the target cup, stripping it from said arbor.

9. In a control mechanism for feeding and orienting tubular workpieces with respect to a vertical press or other tool;

a framework spaced from said press;

a pair of parallel spaced slide support shafts on said framework;

a reciprocal carriage slidably mounted on said shafts;

an elongated splined shaft at its ends rotatively mounted on said framework and extending through said carriage;

an internally splined drive assembly journalled upon said carriage and operatively receiving said splined shaft;

a main arbor assembly journalled upon said carriage including a driven means connected to said drive assembly;

arbor mounting means on said arbor assembly;

an arbor at one end removably mounted upon said arbor mounting means and at its other end adapted to receive and support a tubular workpiece;

a pinion secured to said splined shaft;

a longitudinally reciprocal rack in mesh with said pinion;

a remote controlled selectively operable binary feed means on said framework and connected to said rack for effecting intermittent varying longitudinal movements thereof and corresponding rotary movements of said splined shaft, for orienting said arbor intermittently to different angular positions throughout 360°;

a selectively operable feed mechanism mounted upon said framework and connected to said carriage for effecting corresponding and intermittent longitudinal movements thereof and the arbor thereon;

said arbor mounting means including a cup retainer secured upon the end of said arbor mounting means;

a target cup axially nested in said cup retainer and longitudinally adjustable therein;

and a pair of opposed arbor-retaining cam fingers pivoted on said target cup normally biased to an open arbor release position and adapted on closing to retainingly engage said arbor.

10. In a control mechanism for feeding and orienting tubular workpieces with respect to a vertical press or other tool;

a framework spaced from said press;

a pair of parallel spaced slide support shafts on said framework;

a reciprocal carriage slidably mounted on said shafts;

an elongated splined shaft at its ends rotatively mounted on said framework and extending through said carriage;

an internally splined drive assembly journalled upon said carriage and operatively receiving said splined shaft;

a main arbor assembly journalled upon said carriage including a driven means connected to said drive assembly;

arbor mounting means on said arbor assembly;

an arbor at one end removably mounted upon said arbor mounting means and at its other end adapted to receive and support a tubular workpiece;

a pinion secured to said splined shaft;

a longitudinally reciprocal rack in mesh with said pinion;

a remote controlled selectively operable binary feed means on said framework and connected to said rack for effecting intermittent varying longitudinal movements thereof and corresponding rotary movements of said splined shaft, for orienting said arbor intermittently to different angular positions throughout 360°;

a selectively operable feed mechanism mounted upon said framework and connected to said carriage for effecting corresponding and intermittent longitudinal movements thereof and the arbor thereon;

said arbor including an arbor body having an annular retainer slot at one end, its opposite end having a reduced portion defining a stop shoulder and adapted to receive the end of a tubular workpiece;

a series of radially extending clamp fingers nested and retained in said reduced portion and adapted on outward movement to retainingly engage said workpiece;

a wedge on the interior of the reduced portion normally biasing said clamp fingers outwardly;

spring means encircling said clamp fingers normally urging them inwardly;

and arbor body having an enlarged bore at one end;

a stripper spring in said bore;

said a yieldable button at one end of the body connected to said arbor wedge and including a spring guide extending into said bore and stripper spring whereby the arbor, when nested in said target cup is under axial compression.

11. In a control mechanism for feeding and orienting tubular workpieces with respect to a vertical press or other tool;

a framework spaced from said press;

a pair of parallel spaced slide support shafts on said framework;

a reciprocal carriage slidably mounted on said shafts;

an elongated splined shaft at its ends rotatively mounted on said framework and extending through said carriage;

an internally splined drive assembly journalled upon said carriage and operatively receiving said splined shaft;

a main arbor assembly journalled upon said carriage including a driven means connected to said drive assembly;

arbor mounting means on said arbor assembly;

an arbor at one end removably mounted upon said arbor mounting means and at its other end adapted to receive and support a tubular workpiece;

a pinion secured to said splined shaft;

a longitudinally reciprocal rack in mesh with said pinion;

a remote controlled selectively operable binary feed means on said framework and connected to said rack for effecting intermittent varying longitudinal movements thereof and corresponding rotary movements of said splined shaft; for orienting said arbor intermittently to different angular positions throughout 360°;

a selectively operable feed mechanism mounted upon said framework and connected to said carriage for effecting corresponding and intermittent longitudinal movements thereof and the arbor thereon;

a support sleeve longitudinally adjustable upon said arbor mounting means;

and a bracket secured upon said sleeve extending beyond said target cup and terminating in a cradle support and stop for the arbor in axial registry with said target cup.

12. A binary feed means comprising a series of axially aligned cylinder assemblies supported and arranged in a stack upon a framework, each cylinder assembly having a piston and piston rod with one cylinder connected to an adjacent cylinder assembly in such successive manner that relative movement between one cylinder and its piston rod will effect a corresponding movement of all cylinder assemblies outwardly thereof;

the relative feed movements of each cylinder assembly in the stack of cylinders from end to end being progressive binary movements such as 1, 2, 4, 8, 16, 32, 64, etc., units of length, the outermost cylinder assembly being axially connected to a longitudinal feed mechanism;

a source of pressure fluid;

a solenoid control valve interconnecting each cylinder assembly and source, said valve having a valve element normally biased for delivering pressure fluid to maintain said cylinder assembly retracted, the energization of selected ones of said solenoid control valves actuating its corresponding cylinder for a corresponding binary feed movement;

a remote control means for said binary feed means including an electrical circuit and a power source, the solenoid of each of said valves having a normally open movable electrical contact in said circuit, said control means having a series of such contacts in a row;

a switching means in said circuit including an elongated power contact overlying and spaced from said row of solenoid contacts;

and a punched card interposed between said row of contacts and said power contact;

there being one or more spaced apertures in said card aligned with said contacts permitting registry thereof with said power contact for the selective energization at one time of one or more corresponding cylinder assemblies to produce a preselected feed movement as determined by the location of said spaced apertures;

a card holder mounted on said framework and having a base with a series of spaced apertures in a row corresponding to each of said solenoid controlled valves;

and an additional series of spaced rows of spaced apertures corresponding to said laterally spaced power contacts;

said normally open movable contacts being nested within and projecting above each of said base apertures;

and a cover plate hinged to said base;

said cover plate mounting said series of laterally spaced elongated power contacts;

to provide electric power to said rows of contacts selectively when hinged to closed position over said rows of contacts; and clamping means on said framework securing said cover plate in registry with said base.

13. In a control mechanism for feeding and orienting tubular workpieces with respect to a vertical press or other tool;

a framework spaced from said press;

a pair of parallel spaced slide support shafts on said framework;

a reciprocal carriage slidably mounted on said shafts;

an elongated splined shaft at its ends rotatively mounted on said framework and extending through said carriage;

an internally splined drive assembly journalled upon said carriage and operatively receiving said splined shaft;

a main arbor assembly journalled upon said carriage including a driven means connected to said drive assembly;

arbor mounting means on said arbor assembly;

an arbor at one end removably mounted upon said arbor mounting means and at its other end adapted to receive and support a tubular workpiece;

a pinion secured to said splined shaft; p1 a longitudinally reciprocal rack in mesh with said pinion;

a remote controlled selectively operable binary feed means on said framework and connected to said rack for effecting intermittent varying longitudinal movements thereof and corresponding rotary movements of said splined shaft, for orienting said arbor intermittently to different angular positions throughout 360°;

and a selectively operable feed mechanism mounted upon said framework and connected to said carriage for effecting corresponding and intermittent longitudinal movements thereof and the arbor thereon;

said feed mechanism including a second remote controlled selectively operable binary feed means mounted upon said framework lengthwise thereof;

a longitudinally reciprocal rack gear extending axially of said second binary feed means;

a carriage feed means on said framework connected to said carriage;

and a rotary actuator on said framework connected to said feed means and including a pinion in mesh with and driven by said rack gear;

said second bianry feed means including a mounting bracket upon said framework;

a series of horizontally disposed axially aligned cylinder assemblies anchored to said bracket and slidably supported upon said framework, each cylinder assembly having a piston and piston rod, with one cylinder assembly connected to an adjacent cylinder assembly in such successive manner that the relative movement between a cylinder and its piston rod will effect corresponding movement of all cylinder assemblies outwardly thereof, and the energization of any intermediate cylinder assembly providing an additive effect to any other cylinder assembly movement to provide a composite longitudinal movement of the outermost cylinder assembly;

the relative feed movement of each cylinder assembly from one end to the other of said cylinder being of progressive binary movements such as a progression 1, 2, 4, 8, 16, 32, 64, etc. units of length;

the movable part of the outermost cylinder assembly being axially connected to said rack gear to govern successive longitudinal movements thereof, thereby effecting successive longitudinal movements of said carriage and workpiece supporting arbor.

14. In a control mechanism for feeding and orienting tubular workpieces with respect to a vertical press or other tool;

a framework spaced from said press;

a pair of parallel spaced slide support shafts on said framework;

a reciprocal carriage slidably mounted on said shafts;

an elongated splined shaft at its ends rotatively mounted on said framework and extending through said carriage;

an internally splined drive assembly journalled upon said carriage and operatively receiving said splined shaft;

a main arbor assembly journalled upon said carriage including a driven means connected to said drive assembly;

arbor mounting means on said arbor assembly;

an arbor at one end removably mounted upon said arbor mounting means and at its other end adapted to receive and support a tubular workpiece;

a pinion secured to said splined shaft;

a longitudinally reciprocal rack in mesh with said pinion;

a remote controlled selectively operable binary feed means on said framework and connected to said rack for effecting intermittent varying longitudinal movements thereof and corresponding rotary movements of said splined shaft, for orienting said arbor intermittently to different angular positions throughout 360°;

and a selectively operable feed mechanism mounted upon said framework and connected to said carriage for effecting corresponding and intermittent longitudinal movements thereof and the arbor thereon;

said binary feed means including a series of axially aligned cylinder assemblies supported and arranged upon said framework, each cylinder assembly having a piston and piston rod with one cylinder assembly connected to an adjacent cylinder assembly in such successive manner that relative movement between one cylinder and its piston rod will effect a corresponding movement of all cylinder assemblies outwardly thereof, the relative feed movements of each cylinder assembly being progressive binary movements such as 1, 2, 4, 6, 8, 16, 32, 64, etc. units of length, the outermost cylinder assembly being axially connected to said rack;

a source of pressure fluid;

a solenoid controlled valve interconnecting each cylinder and source, and having a valve element normally biased for delivering pressure fluid to maintain said cylinder retracted;

energization of the respective valve activating its corresponding cylinder for a corresponding feed movement;

the remote control for said binary feed means including an electrical circuit including a power source, the solenoid of each valve having a normally open movable electrical contact in said circuit, providing a series of such contacts in a row;

and a switching means in said circuit including an elongated power contact overlying and spaced from said row of solenoid contacts;

and a punch card interposed between said row of contacts and said power contact, there being one or more spaced apertures in said card aligned with said contacts, permitting registry thereof with said power contact selectively for the energization at one time of one or more corresponding cylinder assembly to produce a pre-selected feed movement.

* * * * *